April 1, 1958

G. T. McCLURE 2,829,010

FLUID PRESSURE BRAKE APPARATUS

Filed Oct. 26, 1953

INVENTOR.
Glenn T. McClure
BY
Adelbert A. Steinmiller
ATTORNEY

INVENTOR.
Glenn T. McClure
BY
Adelbert A. Steinmiller
ATTORNEY

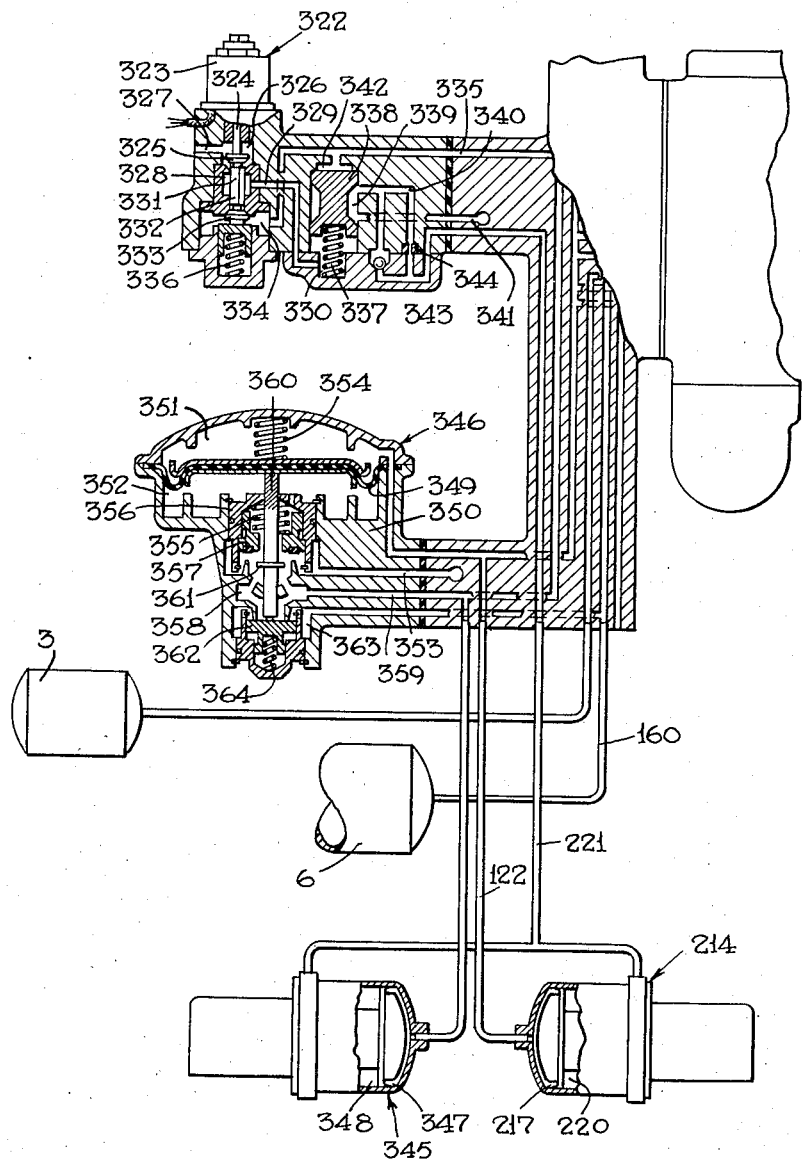

United States Patent Office 2,829,010
Patented Apr. 1, 1958

2,829,010

FLUID PRESSURE BRAKE APPARATUS

Glenn T. McClure, McKeesport, Pa., assignor to Westinghouse Air Brake Company, Wilmerding, Pa., a corporation of Pennsylvania Application October 26, 1953, Serial No. 388,189

26 Claims. (Cl. 303—35)

This invention relates to fluid pressure brake equipment and more particularly to the railway type adapted to be controlled by variations in pressure in a brake pipe.

In the international movement of railway cars in Europe there is a need for an improved brake controlling valve device which may be employed on all types of cars of the different nations and which will operate in harmony with the various brake controlling valve devices now in use on the railroads of the different nations, and one object of the invention is the provision of such a brake controlling valve device.

The brake controlling valve devices now in use in Europe are of the graduated release type and not required to select between service and emergency rates of brake pipe reduction as in the United States of America. Moreover, perhaps fifty to sixty percent of the cars being operated in trains in Europe may not be provided with any brake equipment at all or with brake equipment which is in an inoperative condition and are merely "piped through." It is customary to operate trains in which such unbraked cars may be concentrated adjacent each other in one section of a train, making it difficult to transmit a reduction in brake pipe pressure from one braked car to another through a train for applying the brakes on the brake-equipped cars.

Another object of the invention is the provision of an improved brake controlling valve device for European service having quick service means for positively transmitting a reduction in brake pipe pressure in a desired minimum of time from one braked car to another through a whole train of such a type as described above, and for positively insuring operation of the respective brake controlling valve devices.

Another object is to provide for compensation of brake cylinder leakage during an application of the brakes.

Another object is the prevention of overcharge of brake equipment.

Another object is the provision for substantially uniform recharging of the reservoirs in a brake equipment on a car and the brake equipments in a train and thereby the uniform release of brakes on all cars following a brake application.

Another object is the provision of a standard basic braking unit of the European type which will attain the objects set forth above and which will be conducive to modifications to meet special requirements such as extreme load conditions, extreme speed conditions, or special train assemblage.

Other objects and advantages will become apparent from the following more detailed description of the invention along with the accompanying drawings, wherein.

DESCRIPTION

Figure 1:
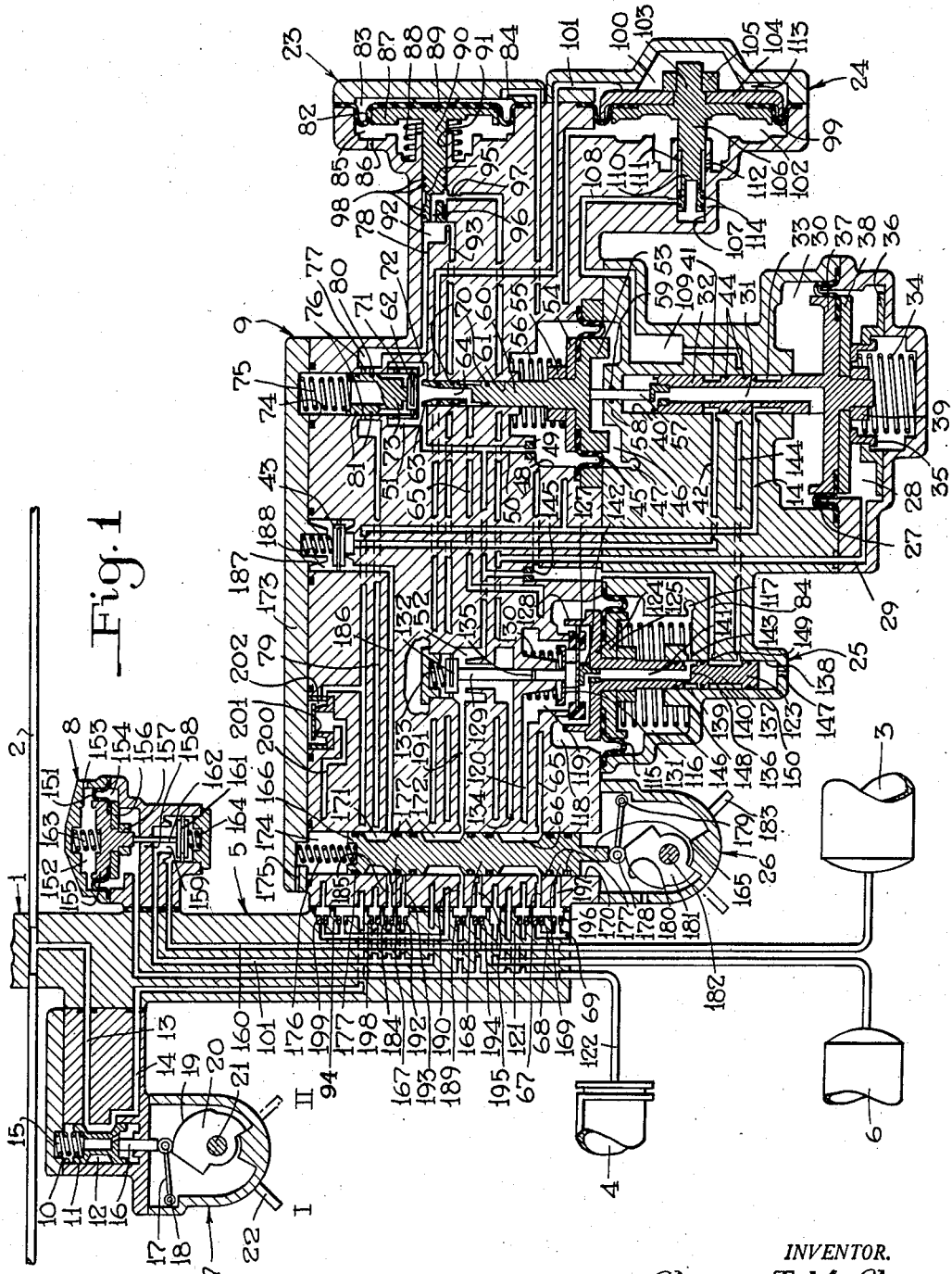
Fig. 1 is a diagrammatic view of a fluid pressure brake equipment embodying the invention.

As shown in Fig. 1 of the drawings, the brake equipment embodying the invention comprises a brake controlling valve device 1 adapted to operate in response to a reduction in pressure in a brake pipe 2 to control the supply of fluid under pressure from a supply reservoir, hereinafter referred to as an auxiliary reservoir 3, to a brake cylinder device 4 to apply brakes on a car and adapted to respond to charging of said brake pipe with fluid under pressure by charging said auxiliary reservoir with fluid under pressure and by releasing fluid under pressure from said brake cylinder device.

The brake controlling valve device 1 comprises a pipe bracket 5 to which the brake pipe 2, a control reservoir 6, the auxiliary reservoir 3, and the brake cylinder device 4 are adapted to be connected. On one face of the pipe bracket 5 a cut-out valve device 7 is adapted to be mounted, on another face a brake cylinder limiting valve device 8 is adapted to be mounted, while on a third face the graduated control portion 9 is adapted to be mounted.

The cut-out valve device 7 comprises a casing having a bore 10 in which is slidably mounted a plunger 11 which is reduced intermediate its ends so as to define within said bore a chamber 12. With the plunger 11 in the position shown in Fig. 1 the chamber 12 will connect a passage 13 leading to the brake pipe 2 to a passage 14 leading to the graduated control portion 9.

A spring 15 contained in the bore 10 urges a plunger 11 downwardly into abutting contact with the upper end of a pusher stem 16 slidably mounted in the casing. The other end of the pusher stem 16 engages one end of a follower 17 which is rockably mounted at its other end on a stud 18 secured in the casing. The free end of the follower 17 is adapted to ride an inclined surface 19 of a cam 20 rigidly secured on a shaft 21 rotatably mounted in the casing for operation by a handle indicated at 22.

With the handle 22 in the position designated at I, in which it is shown in Fig. 1, the cam 20 is in a position to permit spring 15 to press the plunger 11 into a position in which brake pipe 2 is connected to graduated control portion 9 by way of the passage 13, the chamber 12 and the passage 14. Upon rotation of the handle 2 in a counterclockwise direction to a position designated at II the cam 20 will permit spring 15 to actuate the plunger 11 downwardly until chamber 12 is out of register with passage 13 and communication between brake pipe 2 and control portion 9 is cut off thereby.

In addition to the cut-out valve device 7 just described, the brake controlling valve device 1 further comprises a charging or cut-off valve device 23, a quick service valve device 24, an inshot valve device 25 and a service selector valve 26.

The graduated control portion 9 comprises a diaphragm 27 clamped about its periphery between two sections of a casing and combining with said casing to define at one side a chamber 28 which is connected by way of a passage and pipe 29 to the control reservoir 6, and to define at the other side a chamber 30 which is normally open to brake pipe 2 through a passage 31 in a follower stem 32, a chamber 33, passage 14, chamber 12 in the cut-off valve portion 7 and passage 13, as shown in Fig. 1 of the drawings. A spring 34 is mounted in chamber 28 between a portion of the casing and a spring seat member 35 slidably mounted in a stop member 36. As will appear more fully later, the stop member 36 serves to limit downward movement of diaphragm 27 against the force of spring 34 in response to an excessive pressure of fluid supplied to chamber 30 from the brake pipe 2.

The follower stem 32 has formed integral therewith in chamber 30 a follower plate 37 and extends downwardly therefrom, as viewed in Fig. 1, through a central opening in diaphragm 27 into chamber 28, where it makes screw-threaded connection with a follower plate 38 and a locking nut 39 for clamping the central portion of said diaphragm.

Extending upwardly from the follower plate 37, the follower stem 32 is slidably mounted in a bore 40 formed in the casing and is reduced at two places to define within said bore the annular chamber 33 previously described and an annular chamber 41 which is open by way of a passage 42 to the seat of an auxiliary reservoir charging check valve 43. Intermediate chambers 33 and 41 a pair of sealing rings 44 are slidably mounted between the stem 32 and the wall of the bore 40 to prevent leakage of fluid under pressure between said chambers.

The graduated control portion 9 further comprises a diaphragm 45 clamped about its periphery between two sections of the casing and combining with said casing to define at one side a chamber 46 which is open to atmosphere by way of a vent port 47 and at the other side a chamber 48 which is open through a choke 49 to a passage 50 leading to a chamber 51 in the control portion 9 and to a brake cylinder inshot chamber 52 in the inshot valve device 25. The diaphragm 45 is clamped at its center between a follower 53 which extends through central openings in said diaphragm and a follower plate 54 and makes a screw-threaded connection with a nut 55 in chamber 48. A spring 56 is mounted in chamber 48 between a wall of the casing and the follower plate 54 for urging the diaphragm 49 downwardly toward the position in which it is shown in the drawing. This position is the normal release position and is defined by contact of the follower plate 38 with the spring-pressed spring seat 35, which is effective through the medium of pusher stem 57 extending through an opening in a wall 58 between the upper end of bore 40 and chamber 46 and abutting follower stem 32 at its lower end and follower 53 at its upper end, to define normal release position of diaphragm 45. A sealing ring 59 is mounted in a groove in the wall 58 and encircles the pusher stem 57 to prevent leakage of fluid under pressure from bore 40 to atmospheric chamber 46.

The diaphragm follower 53 has formed integral therewith a follower stem 60 which extends upwardly through the chamber 48 and a suitable bore 61 in the casing, in which it is slidably mounted, into chamber 51 where its upper end may engage a valve 62 contained therein. The upper end of stem 60 is provided with an annular valve seat 63 which seat encircles the mouth of a longitudinal passage 64 in said stem which constantly registers with a passage 65 constantly connected to atmosphere by way of chamber 66 and passage 67 in service selector valve device 26, choke 68 and vent port 69. Thus, chamber 51, which is normally open to atmosphere will be closed off from atmosphere upon upward movement of follower stem 60 and sealing engagement of valve seat 63 with valve 62. A pair of sealing rings 70 are mounted in suitable grooves in the stem 60 to make sealing contact with the casing and prevent leakage of fluid under pressure from chambers 48 and 51 to the passage 65. The valve 62 is disposed within a depending tubular element 71 rigidly secured in the casing in chamber 51 and is adapted to rest on an inwardly extending lip 72 at the bottom of said element. A piston valve 73 is slidably mounted in a bore 74 in coaxial alignment within element 71 and follower stems 32 and 60 and is arranged to abut the top of valve 62, as viewed in the drawing, and urge it downwardly under the pressure of a spring 75 operably mounted in the upper end of said bore. A plurality of openings or ports 76 are arranged in a circle around the wall of bore 74 at a point intermediate its ends to connect said bore to an annular chamber 77 encircling the bore, which chamber is open to a passage 78 leading to the charging valve device 23 and open to a passage 79 leading ultimately to auxiliary reservoir 3 by a route to be described later. A restricted port or choke 80 which may connect bore 74 to chamber 69, is spaced inwardly of the ports 76 for providing for a limited flow of fluid under pressure from the auxiliary reservoir 3 to the brake cylinder device 4 in the event of brake cylinder leakage. A pair of sealing rings 81 are mounted in suitable grooves in the piston valve 73 for sealing engagement with the wall of the bore 74 at opposite sides of ports 76 and 80 at a distance sufficient to close all ports or to open the brake cylinder maintaining port or choke 80 only.

The charging valve device 23 comprises a diaphragm 82 clamped at its periphery between two sections of the casing and combining with the casing to define at one side a chamber 83 which is connected to a passage 84 leading to the inshot valve device 25 and at the other side a chamber 85 which is open to atmosphere through a vent port 86. Contained in the chamber 85 in a diaphragm follower 87 which is urged outwardly by a spring 88, operably mounted in chamber 85, to a charging position which is defined by contact of the diaphragm 82 with a stop 89 formed in the casing in chamber 83.

Formed integral with the diaphragm follower 87 is a combined follower stem and piston valve 90 which is slidably mounted in a bore 91 so as to define at its inner end a chamber 92 which is always open to passage 78 and may be connected, as shown in the drawing, to a passage 93 and a choke 94 to brake pipe passage 14. Outwardly of chamber 92 a chamber 95 is defined by a reduced portion of piston valve 90 and a wall of the bore 91, which chamber is constantly open to chamber 92 by way of a passage 96 formed in said piston valve. Chamber 95 may also be connected through a choke 97 to the control reservoir passage 29. At each side of chamber 92 a pair of sealing rings 98 are mounted in suitable grooves in piston valve 90 to prevent leakage of fluid under pressure from chamber 95 through bore 91 in either direction.

The quick service valve device 24 comprises a diaphragm 99 clamped about its periphery between two sections of the casing with which said diaphragm combines to define at one side a chamber 100 which is constantly open to a passage 101 leading to the auxiliary reservoir 3 by way of the brake cylinder limiting valve device 8 and at the opposite side a chamber 102 which is always open to passage 14. The diaphragm 99 is clamped at its center between a follower 103 which extends through central openings in said diaphragm and a follower plate 104 to make screw-threaded connection with a nut 105 in chamber 100. Formed integral with follower 103 is a follower stem 106 which is slidably guided in a bore 107 formed in the casing which bore is open to chamber 102 and to a passage 108 leading to a quick service volume 109. A reduced portion 110 of stem 106 defines in part a chamber 111 within bore 107 which may connect passage 108 through a port 112 to chamber 102 upon inward deflection of diaphragm 102 from normal position defined by contact of follower plate 104 with a stop 113 formed in chamber 100, as shown in Fig. 1 of the drawings. The inner end of the follower stem 106 is provided with a pair of sealing rings 114 which, in normal position of said stem, bracket the mouth of passage 108 so as to prevent leakage of fluid under pressure between chamber 102 and said passage.

The inshot valve device 25 comprises a diaphragm 115 clamped about its periphery between two sections of the casing with which it combines to define at one side a chamber 116 which is open to atmosphere by way of a vent port 117 and at the other side a chamber 118 which may be connected to a chamber 119 which is connected to the brake cylinder device 4 by way of a passage 120, a choke 121 and a passage and pipe 122. The center of the diaphragm 115 is clamped to a follower stem 123 by means of an integral follower plate 124 contained in chamber 118 and a follower plate 125 in chamber 116 secured to said stem by means of a nut 126. A valve 127 is operably mounted in chamber 118 for controlling the flow of fluid under pressure between chambers 118 and 119, the valve being slidably guided in a cylindrical portion 128 formed on the upper face of the follower plate 124. A pusher stem 129 is held in abutting contact with the upper face of the valve 127 by means of a spring 130 interposed between a wall of the chamber 119 and a spring seat 131 carried on the said stem. The pusher stem 129 extends through a suitable opening in the casing, in which it is slidably guided, into the inshot chamber 52 for operation of an inshot valve 132 mounted therein against the force of a bias spring 133 which constantly urges said valve toward its seated position in which communication of chamber 52 to the brake cylinder device 4 by way of a passage 134 and passage 122 is cut off. Leakage of fluid under pressure between chamber 119 and passage 134 is prevented by a sealing ring 135 carried in a suitable groove in the pusher stem 129.

The follower stem 123 is further provided with two, spaced-apart reduced portions 136, 137 with a bore 138 provided in the casing for slidably guiding said stem and forming within said bore a pair of chambers 139 and 140, respectively. The chamber 139 is connected to chamber 118 by way of a longitudinal passage 141 formed in the stem 123 and a fitting 142, upon which the valve 127 is supported, and may be connected to atmosphere by way of a passage 143, chamber 116 and vent port 117, as shown in Fig. 1. With stem 123 positioned as shown in the drawing chamber 140 will connect a passage 144 leading from the quick service volume 109 to passage 84 which is connected to chamber 83 in the charging valve device 23 and through a choke 145 to the brake cylinder passage 50. A control spring 146 is operatively mounted in chamber 116 between a portion of the casing and the follower plate 125 so as to normally hold the follower stem 123 in the position shown, in which position inshot valve 132 is held unseated by spring 146 acting through the medium of stem 129 and valve 127 is held seated by contact with fitting 142. The lower end of the bore 138 is open to atmosphere by way of a vent port 147. A sealing ring 148 is mounted in a suitable groove in the follower stem 123 within the bore 138 to prevent leakage of fluid under pressure between chambers 116 and 139. Likewise, a sealing ring 149 will prevent leakage between chambers 139 and 140, and a sealing ring 150 will prevent leakage from chamber 140 to atmosphere through bore 138 and vent port 147.

The brake cylinder limiting valve device 8 comprises a casing containing a diaphragm 151 clamped about its periphery between two sections of the casing so as to define at one side a chamber 152, which is open to atmosphere by way of a vent port 153, and at the other side a chamber 154 which is constantly connected to brake cylinder device 4 through the passage 122. The diaphragm 151 is clamped at its center between a follower 155 contained in chamber 152 and extending through a central opening in said diaphragm and a follower plate 156 and making screw-threaded connection with a nut 157 in chamber 154.

A partition wall 158 separates chamber 154 from a chamber 159 which is always open to auxiliary reservoir 3 by way of a passage and pipe 160 and is normally connected to the passage 101 leading to chamber 100 in the quick service valve device 24 and through passage 79 to chamber 77 in the control portion 9. A valve 161 is operably mounted in chamber 159 for controlling communication between said chamber and passage 160 and thereby between auxiliary reservoir 3 and the chamber 77 in the graduated control portion 9. This valve 161 is held in its normal unseated position by a pusher stem 162 slidably mounted in a suitable opening in the wall 158, which stem in chamber 154 abuts the follower 155 which is subject to the force of a control spring 163. The valve 161 is held in contact with the lower end of the pusher stem 162 by force of a bias spring 164 contained in chamber 159. Upon an increase in pressure of fluid in chamber 154 to approximately ten pounds, this pressure will deflect diaphragm 151 upwardly against the force of control spring 163, thereby permitting spring 164 to seat valve 161 to thereby cut off communication between the auxiliary reservoir 3 and the graduated control portion 9 and prevent further flow of fluid under pressure from said auxiliary reservoir.

The service selector valve device 26 is manually adjustable to provide for different rates of application and release of brakes on a car according to whether it is passenger or freight service in which the car is to be operated. To this end valve device 26 comprises a piston valve member 165 composed of four spaced pistons 166, 167, 168 and 169 slidably mounted in a bore 170 in the casing and defining therein a chamber 171 between pistons 166 and 167, a chamber 172 between pistons 167 and 168, and the chamber 66 between pistons 168 and 169. A cover portion 173 closes the upper end of a chamber 174 defined in bore 170 at the upper side of piston 166, as viewed in Fig. 1, which chamber is open to atmosphere through an opening 175 formed in said cover portion. Interposed between cover portion 173 and piston 166 is a spring 176 which constantly urges the piston valve member 165 downwardly. A sealing ring 177 is provided in the periphery of piston 166 and a pair of identical sealing rings 177 is provided in the respective peripheries of pistons 167, 168 and 169 in the usual manner for preventing leakage of fluid under pressure between adjacent chambers.

The lower end of the piston valve member 165, as viewed in Fig. 1, extends downwardly into contact with the free end of a follower 178 which is rockably mounted at its other end on a stud 179 anchored in the casing. The free end of the follower 178 is adapted to ride an inclined surface 180 of a cam 181 rigidly secured on a shaft 182 rotatably mounted in the casing for operation by a handle indicated at 183.

With the handle 183 in position for freight service as shown in Fig. 1, the piston valve member 165 will be in its uppermost position, in which the rate of charging of the auxiliary reservoir 3 will be controlled by a choke 184 interposed between passage 101 and a passage 185 leading to chamber 171 which is connected by way of a passage 186 to a chamber 187 containing the charging check 43 and a regulating spring 188. In freight service position the rate of application will be controlled solely by a choke 189 interposed between brake cylinder passage 122 and a passage 190 leading to chamber 172 which is always connected by way of a passage 191 to inshot chamber 52, and the rate of release will be controlled solely by the choke 68 by the path previously described. With the handle in position for passenger service as shown in a broken line in Fig. 1, the piston valve member 165 will be in its lowermost position, in which a choke 192 will be connected through a passage 193 to chamber 171 in parallel with choke 184 so that the combined flow capacities of chokes 184 and 192 will be effective to control the rate of charging of the auxiliary reservoir 3. Also, in passenger service position a choke 194 will be connected through a passage 195 to chamber 172 in parallel with choke 189 so that the combined capacities of chokes 189 and 194 will become effective in controlling the rate of brake application, and a choke 196 will be connected through a passage 197 to release chamber 66 in parallel with choke 68 so that the combined capacities of chokes 68 and 196 will become effective to control the rate of release of a brake application.

OPERATION

With the brake equipment devoid of fluid under pressure all parts will assume the positions in which they are shown in the drawing, except the manually adjustable service selector valve device 26, which for the time being will be assumed to be in freight position as shown, and the cut-off valve device 7, which for the time being will be assumed to be in position indicated at I, as shown in the drawing.

Initial charging of the brake equipment

To initially charge the brake equipment on a train, as well as recharging the brake equipment to effect a release of brakes after a brake application, it is customary to move the usual brake valve device (not shown) first to a release position for supplying fluid high pressure directly from the usual main reservoir on a locomotive to the brake pipe 2 at the locomotive, and then after a lapse of a period of time, which varies according to different conditions, the brake valve device will be moved to running position to reduce the pressure of further supply of fluid to said brake pipe to the normal degree at which it is desired to maintain it.

The pressure in the brake pipe on about the first fifteen cars of a train will therefore be initially increased to a degree in excess of the degree normally carried, the degree of such overcharge in the brake pipe being greatest on the car coupled to the locomotive and decreasing from car to car back through the train from the locomotive, and the above-mentioned time which the brake valve device is allowed to remain in release position is intended to be so limited as to prevent overcharging of the brake equipment on the cars on which the brake pipe is voluntarily overcharged.

When fluid under pressure is supplied to the brake pipe 2, as above described, such fluid will be supplied through passage 13 to chamber 12 in the cut-out valve device 7 whence it will flow by way of passage 14 to chamber 33 in the graduated control portion 9, and thence through passage 31 in the follower stem 32 to chamber 30. Fluid under pressure thus supplied to passage 31 will also flow through chamber 41 and passage 42, past check valve 43 which will be unseated against the pressure of spring 188 into chamber 187, and thence through passage 186, chamber 171 in the service selector valve device 26 and passage 185, choke 184, and passage 101 to chamber 159 in the brake cylinder limiting valve device 8, whence it will flow through passage and pipe 160 to auxiliary reservoir 3. Fluid under pressure thus applied to passage 101 will also flow through choke 198 and the passage 79 to chamber 77 in the graduated control valve portion 9, where it will be augmented by flow through passage 78 from chamber 92 in the charging valve device 23 which is supplied with fluid under pressure from brake pipe 2 by way passage 14, choke 94 in pipe bracket 5 and passage 93. Fluid under pressure thus supplied to chamber 92 will also flow through passage 96 and choke 97 therein to passage 29, through which it will flow to control reservoir 6 and also to chamber 28 in the graduated control valve device 9 where it will act on diaphragm 27 in opposition to the pressure of fluid in chamber 30 supplied from the brake pipe by the route previously described. Fluid under pressure in passage 101 will also flow to chamber 100 in the quick service valve device 24 where it will act on diaphragm 99, but will not be sufficient to overcome the opposing pressure of fluid in chamber 102 supplied through passage 14 at brake pipe pressure. By reason of the restriction of choke 184 in the rate of charging auxiliary reservoir 3 brake pipe pressure in chamber 102 will prevail, thereby holding diaphragm 99 in a position defined by contact of follower plate 104 with stop 113, in which position quick service passage 108 will be closed off by sealing rings 114.

Upon instituting initial charging of the brake pipe 2 the higher than normal brake pipe pressure obtained on cars adjacent to the locomotive will start to rush from passage 14 through chamber 33 and passage 31 into chamber 30 and increase the pressure therein so rapidly as to create a force on diaphragm 27 which will move the diaphragm 27, follower plate 37 and stem 32 downwardly from the positions in which they are shown in the drawing against the force of spring 34 which is provided to prevent overcharging of the auxiliary reservoir 3 and control reservoir 6, as will be described in detail later.

As diaphragm 27 thus moves downwardly, the follower stem 32 will tend to block off the opening of passage 14 to chamber 33 and on cars near the locomotives the passage 14 will actually be cut off from chamber 33. The fluid under pressure thus supplied to chamber 30, however, will promptly dissipate through the paths previously described to charge the auxiliary reservoir 3 and the control reservoir 6. The resulting increase of pressure in the control reservoir 6 gradually becomes effective in the control reservoir pressure chamber 28 at the opposite side of diaphragm 27 and by this action the pressures in chambers 28 and 30 at opposite sides of diaphragm 27 will tend to equalize, as a result of which spring 34 will gradually return the diaphragm and follower stem 19 to the normal charging position shown in the drawing, in which position charging continues as described above until the equipment is charged with fluid under pressure at a normal pressure.

Where the degree of overcharge of brake pipe is less, as on cars farther back from the locomotive, the opening of passage 14 to chamber 33 may initially fully close as on cars right at the locomotive, but will be promptly reopened to an extent necessary to maintain sufficient pressure in chamber 30 to counterbalance opposing pressure of spring 34 and increasing pressure of fluid in chamber 28 the same as on cars right at the locomotive.

Further back in the train where the brake pipe may only become charged to the normal pressure carried, the diaphragm 27 and follower stem 32 may be moved by such pressure downwardly against spring 34 to a position where the opening between passage 14 and chamber 33 will be sufficiently closed to so restrict supply of fluid under pressure to chamber 30 as to limit the pressure obtained therein in accordance with the build-up of pressure in chamber 28, and finally toward the rear end of the train where the pressures in the brake pipe will only gradually increase, the increase in pressure in chamber 28 with respect to that in chamber 30 may be such that the diaphragm 27 and follower 37 will be held by spring 34 in the position in which they are shown in the drawing with the said opening fully opened.

When the brake valve device is operated to reduce the pressure of fluid supply to the brake pipe to the normal degree, the rate of supply of fluid under pressure to chamber 39 in the brake equipment will be correspondingly reduced and at the front of the train the diaphragm follower 37 and stem 32 will be operated by spring 34 and pressure in chamber 28 to open the passage 14 to a greater degree as necessary in accordance with the reduced brake pipe pressure to maintain the balance between pressure of fluid in chambers 28 and 30 and finally when the control reservoir pressure in chamber 28 becomes increased to within about seven-tenths of a pound of the pressure of fluid in the brake pipe, spring 34 will move the diaphragm 27 and follower stem 32 to normal position, in which it is shown in the drawing, as will also occur on any cars further to the rear in the train when this same relationship of pressure is obtained.

With the passage 14 wide open the position of follower stem 32 will not determine the rate of charging of the brake equipment, said rate being then controlled by the flow capacity of choke 94 of the auxiliary reservoir charging choke 184 and the control reservoir charging choke 97. In charging the brake equipments of a train, it will now be seen that near the front of the train the rate at which charging other brake equipments will occur is limited to the flow capacity of the connection between passages 14 and chamber 33 which is gradually opened by spring 34 in accordance with the increase in pressure in chamber 28 to maintain a substantially constant rate of charging, while to the rear of the train where the brake pipe is not overcharged the charging rate will be limited to the capacity of chokes 94, 184, 198 and 97.

The length of time in which the brake pipe at the front end of the train is overcharged, as above described, is intended to be so limited that the register of chamber 33 with passage 14 will prevent overcharging of the supply and control reservoirs at the front of the train, but still sufficient to permit charging of said reservoirs to a pressure substantially equal to normal brake pipe pressure by the time the pressure of fluid supplied to the brake pipe is reduced to normal. The follower stem 32 thus not only prevents overcharging of the brake equipment at the head of the train, but also, due to its limiting the amount of fluid under pressure taken from the brake pipe for charging said reservoirs, causes a greater amount of fluid under pressures to be more quickly forced back through the train for charging the brake equipments there through chokes 94, 184, 198 and 97, the combined restricting effect of such chokes being such as to provide as nearly as possible a uniform charging of such brake equipments and as rapid a rate as possible. The brake equipments at the rear of the train will therefore be charged substantially uniformly at a maximum possible rate and those at the front of the train at a maximum permissible rate as governed by opposing pressures in chambers 28 and 30 which normally will prevent overcharging of the control and supply reservoirs at the front of the train.

In Europe the same cars may be included in trains for either freight service or express service. The preceding description was for the charging of a car in a train for freight service in which a relatively large number of cars are used and consequent to the time of charging of each individual car is longer. For this type of service the handle 183 of the service selector valve device 26 is placed in the position indicated in solid line at F in Fig. 1 of the drawings. For passenger or express service the handle 183 is moved to a position indicated at P by a broken line, in which position chamber 171 in the bore 170 is adapted to register with passage 193 in addition to passage 185. In this position of handle 183 choke 192 is connected in parallel with choke 184, thereby increasing the flow capacity of fluid under pressure from the brake pipe to charging passage 101 and shortening the charging time for that particular brake equipment. Since trains of this type are short the need for forcing fluid under pressure from the brake valve to the rear of the train is of relatively small importance.

If during charging of a train the brake valve device should be allowed to remain for too long a time in the position for supplying fluid under pressure directly from the main reservoir to the brake pipe 2, then there is a possibility that one or more brake equipments adjacent to the locomotive will become slightly overcharged. This is undesirable for it is necessary that the pressure in control reservoir 6 and chamber 28 be equal to normal brake pipe pressure at the end of charging for proper control of subsequent operation of the graduated control portion 9. If slight overchanging does occur, however, then when the brake pipe pressure reduces to normal the excess fluid pressure in the control reservoir 6 will be dissipated back through passage 29, choke 97, passage 96 to chamber 92 in the charging valve device 23, as will also auxiliary resevoir 3 by way of passage 160, chamber 159, passage 101, choke 198, passage 79, chamber 77 and passage 78. The fluid under pressure thus returning to chamber 92 in the charging valve device 23 will be dissipated back to brake pipe 2 by way of passage 93, a dissipating choke 199 and overcharge passage 200, past an overcharge check valve 201, an overcharge chamber 202, and brake pipe passage 14.

With chamber 52 in the inshot valve device 25 vented to atmosphere through passage 50 past valve seat 63, through passages 64 and 65 in the graduated control portion 9, chamber 66 in the selector valve device 26, passage 67, choke 68 and vent port 69, chamber 119 will also be connected to atmosphere by connection to chamber 52 through passage 120, choke 121, passage 122 and passage 134. With chamber 119 connected to atmosphere valve 127 will be held on its seat by the action of spring 146 acting on diaphragm follower plates 125 and 124 in an upwardly direction. With diaphragm 115 and follower 124 and stem 123 in their upper positions chamber 118 is connected to atmosphere by way of fitting 142, passage 141, passage 143, chamber 116, and vent port 117. Also diaphragm follower stem 123 will be in a position to connect quick service volume 109 through passage 144, chamber 140 and passage 84 to chamber 83 in a charging valve device 23.

*Effecting application of brakes*

When it is desired to effect an application of brakes, a reduction in pressure in the brake pipe 2 will be initiated from the brake valve device on the locomotive in the well-known manner. When the brake pipe pressure is reduced as just mentioned, check valve 43 in the graduated control portion 9 will prevent back-flow of fluid under pressure from the auxiliary reservoir 3, although there will be momentarily a slight trickle back from the control reservoir 6 and auxiliary reservoir by way of choke 97, passage 96 and passage 93 in the charging valve device 23, which however, is of no consequence during the operation now under consideration. As a result, the pressure in brake pipe 2 on the first car of the train will promptly reduce to that in the locomotive and when reduced approximately eight-tenths of a pound, for example, such reduction will be effected in chamber 102 in the quick service device 24 relative to the pressure of fluid in chamber 100 which is at control reservoir pressure, whereby a sufficient differential in pressures on opposite sides of diaphragm 99 will be established to deflect the diaphragm in the direction of chamber 102 and move the follower stem 106 to a quick service position defined by contact of the left-hand end of said stem with the end wall of bore 107.

In quick service position of the follower stem 106 chamber 102 will be connected to passage 108, whereupon fluid at brake pipe pressure in said chamber will flow rapidly into the quick service volume 109 where it will approach equalization with chamber 102 to thereby effect a fast local reduction in brake pipe pressure of approximately four pounds, for example. Fluid under pressure thus supplied to quick service volume 109 will flow through passage 144, to chamber 140 in the inshot valve device 25, whence it will flow through passage 84 to chamber 83 to act on diaphragm 82 in the charging valve device 23.

When the pressure of fluid in chamber 83 becomes sufficient to overcome the opposing force of spring 88, say three and five-tenths pounds, the diaphragm 82 will move piston stem 90 inwardly to its cut-off position. In this cut-off position of stem 90 chamber 95 will be out of register with control reservoir passage 29 and brake pipe passage 93 will be blocked off, which will cut off control reservoir 6 from auxiliary reservoir 3 and auxiliary reservoir 3 from brake pipe charging passage 93.

As previously noted, passage 84 is connected through choke 145 to brake cylinder passage 50, which passage is connected to atmosphere through brake cylinder release passage 65 when the graduated control portion 9 is in release position as now assumed. Thus, the fluid under pressure supply from brake pipe to quick service volume 109 through the quick service valve 24, will continue to flow to atmosphere through choke 145 until the control portion 9 moves out of its release position. Sufficient fluid under pressure will be maintained, however, in chamber 83 to hold the follower stem 90 in its reservoir cut-off position described above. The reduction of brake pipe pressure thus effected will hasten the reduction in pressure in the brake pipe of the next operating brake equipped car of a train where the quick service valve device 24 will operate, as thus described, to open a local vent from the brake pipe to hasten the slight reduction to the next operating brake equipped car with train and thus serially, from one operating brake equipment to another through the train, the reduction will be transmitted even though at intervals in the train one or more non-brake equipped car or cars with non-operating brake equipment may be collected together.

It will be further noted that since in Europe brake controlling valve devices do not have to distinguish the difference between service and emergency rates of reduction in brake pipe pressure as in the United States, the quick service reduction in brake pipe pressure effected by operation of the quick service valve device 24 may be as rapid as desired, which, in conjunction with the very low differential in fluid pressure required to operate said quick service valve device, permits any desired rate of serial operation of the quick service valve device in a train.

When the pressure of fluid in the brake pipe 2 is reduced by operation of the quick service valve device 24 as just described, a corresponding reduction in pressure will occur in chamber 30 of the graduated control portion 9, and when the pressure in said chamber becomes sufficiently reduced the control reservoir pressure in chamber 28 will deflect the diaphragm 27 upwardly against the reduced brake pipe pressure until follower stem 60 engages valve 71, and then against the additional pressure of spring 75 in bore 74 to a brake application position defined by contact of locking nut 55 with the casing, as hereinafter described.

It is intended that diaphragm 27 deflects upwardly as thus described, when brake pipe pressure in chamber 30 is reduced for example one and three-tenths pounds below control reservoir pressure in chamber 28. However, if the diaphragm does not move upwardly upon such a reduction of brake pipe pressure, then by operation of the quick service valve device 24 the pressure in brake pipe 2 and chamber 30 will continue to be reduced relative to control pressure in chamber 28 until a sufficient differential between such opposing pressures on the diaphragm is obtained as to insure such movement. It will thus be evident that the positive local quick service venting of fluid under pressure from the brake pipe by operating of the quick service valve device 24 will insure movement of the diaphragm 27 on a brake equipped car even if located in a train to the rear of a bunch of two or more non-brake equipped car or cars provided with brake equipment which is not operating.

When the diaphragm 27 thus moves in response to the reduction in brake pipe pressure in chamber 30, the follower stem 32 and attached diaphragm 45 will move therewith until valve seat 63 of said stem engages the seating surface of valve 62 by which communication will be closed between the brake cylinder passage 50 and brake cylinder release passage 65. Then when the differential and opposing pressures on the diaphragm 27 is further increased sufficiently to overcome the bias pressure of spring 75, the piston valve 73 will be moved to an application position in which chamber 77 will be connected to chamber 51, whereby fluid under pressure will flow from the auxiliary reservoir 3 through pipe and passage 160, chamber 159 in the brake cylinder limiting valve device 8, passage 101, choke 198, passage 79, ports 76 and 80 to chamber 51, and thence to brake cylinder passage 50 leading to inshot chamber 52 in the inshot valve device 25, whence it may flow through passage 134 and pipe 122 to brake cylinder device 4, and also through passage 191 and choke 189 to said brake cylinder pipe 122 with the selector valve device 26 in freight position, as shown in the drawing.

Fluid under pressure thus supplied to brake cylinder passage 122 will also flow through choke 121 and passage 120 to chamber 119 in the inshot valve device 25, where it will act upon the seated area of the valve 127, which is held seated by the pressure of spring 146 acting on the follower plate 125 and through connected follower plate 124 and fitting 142. The flow capacity of choke 121 is so related to the brake cylinder communication that the rate of build-up of fluid pressure in passage 120 and chamber 119 acting on valve 127 corresponds to the rate at which fluid pressure is established in the brake cylinder device 4. When the pressure in chamber 119, and concurrently in brake cylinder device 4, is thus increased to a degree, such as ten pounds, the said pressure acting on the upper side of valve 127 will overcome the opposing pressure of spring 146 and thereby unseat said valve, permitting fluid under pressure in chamber 119 to flow to chamber 118 and act on diaphragm 115 in a downwardly direction. Since the effective area of the diaphragm 115 is much greater than that of the valve 127, the unseating of said valve will provide a force so in excess of the opposing force of spring 146 that the diaphragm and follower stem 123 will snap to its lowermost position in which the atmospheric passage 141 to chamber 118 will be cut off and chamber 140 which is connected to quick service volume 109 will be moved out of register with passage 84 leading to the charging valve device 23. This downward movement of follower stem 123 will permit spring 133 to seat the check valve 132, whereupon further supply of fluid under pressure to the brake cylinder device 4 will be limited to the flow capacity of choke 189 with the selector valve device 26 positioned as shown in the drawing. As fluid under pressure is supplied to the brake cylinder device 4 as just described, such pressure will also flow through choke 49 to become effective in diaphragm chamber 48 where it will act in opposition to control reservoir pressure in chamber 28 acting on diaphragm 27 plus the pressure of spring 34. Assuming that the reduction in brake pipe pressure effected by operation of the brake valve device is limited to some chosen degree, then when the pressure obtained in the brake cylinder device 4 and in chamber 33 is increased to a chosen relation to the degree of brake pipe reduction in chamber 30, the brake cylinder pressure acting in chamber 48 will move the diaphragms 45 and 27 connected by the follower stem 32 downwardly to an application lap position, in which position piston valve 73 will again cut off communication between auxiliary reservoir pressure chamber 77 and brake cylinder pressure chamber 51 to prevent further supply of fluid under pressure to the brake cylinder device 4 thereby limiting the pressure in said brake cylinder device in accordance with the degree in reduction of brake pipe pressure. The application lap position of the follower stem 32 is thus defined by the engagement of the check valve 62 with the lip or inwardly extending shoulder 72 which will limit the effectiveness of the spring 75.

If the engineer desires to increase the degree of brake application he will effect a further reduction in pressure in brake pipe 2 according to the increase in degree of brake application desired. In response to the consequent reduction in pressure in chamber 30 the diaphragm 27 and connected diaphragm 45 will move upwardly to actuate the follower stem 32 and piston valve 73 to uncover the ports 76 and 80, whereupon fluid under pressure will again be supplied from the auxiliary reservoir 3 to the brake cylinder device 4 and chamber 48, and when the pressure in said brake cylinder device and chamber becomes thus increased in proportion to the degree of reduction in brake pipe pressure, the diaphragm assembly will again move the follower stem 32 to application lap position to lap ports 76 and 80 and thereby cut off further supply of fluid under pressure to the brake cylinder device and chamber 48. By thus reducing the brake pipe pressure in such steps as desired, proportional increases in pressure may be provided in the brake cylinder device 4 to provide any selected degree of braking, or if desired, the brake pipe reduction may be made in a single stage resulting in a corresponding build-up in a degree of brake application. Only the pressure of fluid in the auxiliary reservoir 3 will exceed that in the brake cylinder device when what may be considered a full application of the brake is effected, but if what may be called an over-reduction in brake pipe pressure is effected, or the brake pipe pressure is completely released to atmosphere, the pressure of fluid in the supply reservoir and the auxiliary reservoir 3 will equalize into the brake cylinder device 4 and chamber 48, but since diaphragm 45 is smaller than diaphragm 27, this will occur without producing sufficient force on diaphragm 45 to move the diaphragm assemblies and follower stem 32 out of the position in which the ports 76 and 80 will remain lapped.

From the above description it will be clear that an application of brakes may be graduated on in any desired steps or may be made in a continuous step if desired. It will also be noted that closing of valve 132 in the inshot valve device 25 will reduce the rate of brake application to the flow capacity of choke 189. The valve 132 closes at a pressure in the brake cylinder device 4 which is just efficient to displace the brake cylinder piston to its application position but not sufficient to produce effective braking, in order to prevent damaging run-in of the slack in a train. Due to the use of the inshot valve device 7, therefore, provision is made for prompt displacement of the brake cylinder piston so as not to materially lengthen the time required to obtain an effective application of the brakes. The choke 189 then governs the rate of effective brake application for freight service and will provide a sufficiently uniform rate of brake application throughout a train to decelerate it or to bring it to a stop without objectionable shock.

While an application of brakes at a degree proportional to the degree of brake pipe reduction is in effect with the graudated control portion 9 in application lap position, if there should be leakage of fluid under pressure from the brake cylinder device 4, the resulting reduction in pressure therein will create a like reduction in pressure of fluid in chamber 48 acting on diaphragm 45 and thereby in the force opposing control reservoir pressure in chamber 28, and when such reduction has become sufficient, the latter pressure will gradually move the diaphragm assemblage upward. The piston valve 73 moving upward with the diaphragm assemblage will finally start to uncover the main brake cylinder maintaining port 80 and permit fluid under pressure to flow from the auxiliary reservoir 3 to the brake cylinder device 4 and diaphragm chamber 48. The brake cylinder maintaining port 80 will thus remain open until the rate of supply of fluid under pressure to the brake cylinder device and diaphragm chamber 48 becomes sufficient to offset the leakage of fluid under pressure therefrom and prevent further reduction in pressure in diaphragm chamber 48, whereupon movement of the diaphragm assemblage will cease in a position where the pressure of fluid under pressure in the brake cylinder device will be maintained against further drop.

If a brake application is in effect for a sufficient period of time and leakage from the brake cylinder device 4 is such that the pressure of fluid in the auxiliary reservoir 3 becomes reduced to that in the brake cylinder device, which would prevent further maintenance from the auxiliary reservoir 3, but further maintenance is desired, communication connecting chamber 30 to the auxiliary reservoir passage 79 is provided in application lap position through which pressure of fluid in brake cylinder device 4 may be maintained from the brake pipe 2 by flow of fluid under pressure from diaphragm chamber 30 through passage 31 to chamber 41 in follower stem 32 to passage 42, past check valve 43 to chamber 187, whence it will flow through passage 186, chamber 171, passage 185, choke 184 to passage 101 and thence through choke 198 and passage 79 to auxiliary reservoir chamber 77 where it will maintain brake cylinder pressure through port 80 as before. The flow capacity of choke 184 will be limited according to permissible leakage from the brake cylinder device and therefore be so small as not to create a bleed from the brake pipe in case of greater brake cylinder leakage which would prevent prompt response of the respective brake controlling valve devices and brakes on other cars of a train to a change in brake pipe pressure initiated by the train operator. It will be noted that the choke 184 is in parallel with the normal charging communication by way of charging valve device 23 and therefore will be effective with the latter for charging a supply of auxiliary reservoir 3 initially as above described as well as after an application of brakes, but such effect will be substantially negligible due to the relatively small flow capacity of said choke.

*Release of brake application*

In order to effect the release of a brake application and to recharge the brake equipment with fluid under pressure, fluid under pressure will be supplied to the brake pipe 2 and thence through passage 13, cut-out valve portion 7, and passage 14 to chamber 33 in the graduated control portion 9 and thence to chamber 30 by way of passage 31. When the pressure of fluid in chamber 30, acting on one side of diaphragm 27 and brake cylinder pressure in chamber 48 acting on diaphragm 45, create a force on the diaphragm assemblage which will exceed the opposing force created by control reservoir pressure in chamber 28 acting on the opposite side of diaphragm 27, the diaphragm assemblage will move downward. If the diaphragm assembly happens to be in application position, the initial movement thereof will shift the follower stem 32 to application lap position, otherwise all movement will start from said lap position as soon as a sufficient differential is obtained to move the follower stem 32 downwardly and thereby uncover the seat 63 in the upper end of said stem. With seat 63 uncovered fluid under pressure in brake cylinder device 4 will flow to atmosphere through pipe and passage 122, choke 189, passage 190, chamber 172 in the service selector valve device 26, passage 191, chamber 52 in the inshot valve device 25, and passage 50 to chamber 51 in the graduated control portion 9, whence it will flow through passages 64 and 65, to chamber 66 in the service selector valve device 26, passage 67, choke 68 and vent port 69.

As previously described in connection with initial charging of brake equipment, the pressure of fluid in the brake pipe 2 will be increased more rapidly on cars adjacent to the locomotive than on cars further back in the train. Consequently, if a car is close to the locomotive and the pressure of fluid in chamber 30 becomes increased sufficiently against the drain thereof to the auxiliary reservoir 3 to create a downwardly acting force which will overcome the force of spring 34 and control reservoir pressure acting on diaphragm 27, the diaphragm assemblage will be moved downwardly to effect a partial closing of passage 14 and consequent restricting of fluid under pressure to chamber 30 so as to balance the rate of increase therein against the force of fluid pressure in chamber 28 acting on diaphragm 27, and thereby restricting the recharge of the supply reservoir of the auxiliary reservoir 3. The passage 14 may even be closed off completely near the front end of the train, whereupon pressure in chamber 30 will be substantially unchanged while the diaphragm assemblage will be gradually moved upward by control reservoir pressure in chamber 28 as the opposing brake cylinder pressure in chamber 48 acting on diaphragm 45 gradually decreases as just described. Even when overcharge on the brake pipe at the locomotive is terminated if the pressure obtained in chamber 30 against the drain thereof to the auxiliary reservoir 3 provides a force which can overcome the opposing fluid pressure in chamber 28, the diaphragm assemblage will move downward to permit such closing of passage 14 as will be necessary to limit the rate of increase in pressure in chamber 30 to the relatively slow rate at which the auxiliary reservoir pressure can be restored by way of choke passage 42, check valve 43 and choke 184 as described above.

The effect of closing to a greater or less degree of the passage 14 in restoring the pressure of fluid in auxiliary reservoir 3, is therefore at the head end of the train such as to limit the drawing of fluid under pressure from the brake pipe so as to hasten flow of fluid under pressure to the rear of the train for causing operation of the brake controlling valve devices at the rear of the train to their brake release position for also recharging the auxiliary reservoirs there.

As fluid under pressure is thus released from the brake cylinder device 4, the pressure of fluid in chamber 51 will reduce correspondingly and in case the restoration of brake pipe pressure in chamber 48 is limited to some chosen degree, brake cylinder pressure will continue to reduce until its effect in chamber 48 on diaphragm 45 is so reduced with respect to the increase in brake pipe pressure in chamber 30 that control reservoir pressure in chamber 28 acting on diaphragm 27 will move the diaphragm assemblage and follower stem 32 upwardly to a release lap position defined by contact of said stem having valve seat 63 thereon with valve 72. In the release lap position of the follower stem 32 communication will be closed between the brake cylinder device 4 and the brake cylinder release passage 50 to thereby limit the reduction in pressure in said brake cylinder device in accordance with the increase in pressure in the brake pipe 2.

In the manner just described, the pressure of fluid in the brake cylinder device 4 may be graduated off in such steps as desired by proper stepped increases in pressure in the brake pipe 2 or in case the increase in pressure in brake pipe 2 is continuous, a corresponding continuous venting of fluid under pressure from a brake cylinder device will occur. When the pressure in the brake pipe 2 and thereby in diaphragm chamber 30 finally becomes increased to within two or three pounds of the normal pressure carried in the brake pipe, which pressure is effective in control reservoir 6 and acting in chamber 28 on diaphragm 27 in opposition to brake pipe pressure in chamber 30, the diaphragm assemblage will be held in its release position shown as the pressure in brake cylinder device 4 and diaphragm chamber 48 finally reduces to atmospheric pressure and a complete recharging of the auxiliary reservoir 3 to the pressure in the brake pipe.

When the pressure of fluid in the brake cylinder device 4 becomes reduced to a substantially ineffective degree, such as three and five-tenths pounds, the pressure of spring 146 in the inshot valve device 25 will move diaphragm follower stem 123 upwardly, unseating valve 132, which action will connect passage 134 to chamber 52 and seating valve 127, thereby cutting off brake cylinder passage 120 from chamber 118, which chamber at this time will be connected to atmosphere by way of passage 141, chamber 146 and vent port 117. At the same time chamber 140 will shift upwardly, thereby connecting passage 144 to atmosphere through passage 84, choke 145 and passage 50, which passage is connected to the brake cylinder release passage 65 as previously described and thereby venting quick service volume 109 to atmosphere.

It will be observed that fluid under pressure will not be released from the quick service volume 109 by way of such communication until valve 132 is unseated in the inshot valve device 25. This holding of fluid under pressure in the quick service volume 109 until opening of valve 132, which does not occur until a brake application is substantially fully released, will therefore prevent undesirably initiating a quick service reduction in brake pipe pressure and obtaining a consequent shock producing increase in brake application, if while releasing the operator desires to reapply the brakes to a greater degree and therefore reduces brake pipe pressure and causes operation of the quick service valve device 24 to its quick service position. The quick service volume 109 being still charged with fluid under pressure there will be no venting of fluid under pressure from the brake pipe as a result.

As will be readily apparent from the previous description, if a car provided with this brake equipment is to be operated in passenger service the handle 183 of the service selector valve device 26 will be turned to passenger position indicated in a broken line at the letter P, the cam 181 will be rotated in a clockwise direction thereby permitting the spring 176 to actuate the piston valve 165 to a lowermost position in which chamber 66 will register with both passages 67 and 197.

DESCRIPTION OF FIG. 2

Figure 2:
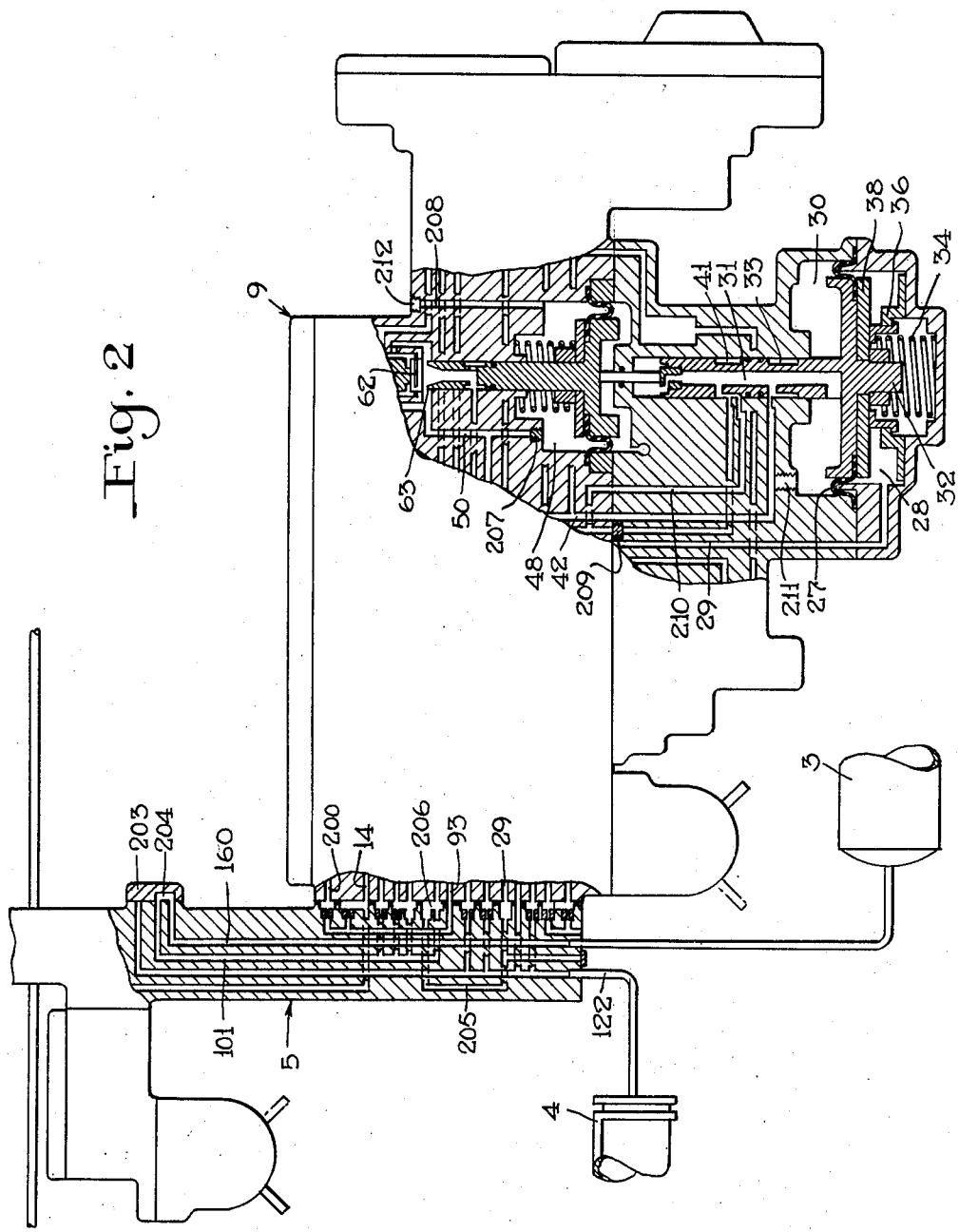
Fig. 2 is a diagrammatic view, partly in section and partly in outline, of the equipment shown in Fig. 1 modified in form to provide for a direct release without graduation.

The structure shown in Fig. 2 differs from the structure shown in Fig. 1 in that a blanking plate 203 is mounted on the pipe bracket 5 in place of the brake cylinder limiting valve device 8 shown in Fig. 1. This blanking plate 203 establishes a continuous connection between auxiliary reservoir pipe 160 and auxiliary reservoir supply passage 101 by way of a cavity 204 and blanks off a branch of brake cylinder passage 122, the fluid pressure in which is used in the structure of Fig. 1 to control the operation of the limiting valve device 8. Another difference is that passage 29, which leads to control reservoir 6 in Fig. 1 is now blanked off in that direction and connected by way of an added passage 205 to an added cavity 206 in the pipe bracket 5 which registers with passage 101, thereby connecting chamber 28 in the control portion 9, which was connected to control reservoir 6 in Fig. 1, to auxiliary reservoir 6 by way of passages 29 and 205, cavity 206, passage 101, cavity 204 and passage 160.

In the control portion 9, communication of brake cylinder pressure to chamber 48 is cut off by a choke plug 207 in the brake cylinder passage 50 and chamber 48 is connected to atmosphere by way of an added passage 208. Thus, brake cylinder pressure is eliminated as a factor in controlling the operation of the control portion 9 for effecting graduated brake applications and brake releases. Another difference in the control portion shown in Fig. 2 from that shown in Fig. 1 is that that portion of auxiliary reservoir charging passage 42, which is adapted to register with chamber 41 in Fig. 1, is cut off by a plug 209 in said passage, and a passage 210 is added, connecting with passage 42 and adapted to register with chamber 41 in Fig. 2, at a point more remote from the brake cylinder release valve 72 to thereby further insure the release valve 72 being unseated before the connection for charging auxiliary reservoir 3 is established. With conditions otherwise, the brakes might not be released with the pressure differential acting on diaphragm 27 becoming more unfavorable to initiating a brake release. Besides the connection through brake pipe supply passage 14, chamber 33 and passage 31 for supplying fluid under pressure to chamber 30, a direct connection between passage 14 and chamber 30 is provided by way of a passage 211, which may be plugged by suitable means when graduated release operation is desired, as will appear later.

When it is desired to effect an application of the brakes, the pressure in chamber 30 is reduced in the same manner as described in connection with Fig. 1. In this case, however, auxiliary reservoir pressure in chamber 28 will be controlling in effecting the responsive upward movement of diaphragm 27 and follower stem 32. Initial upward movement of the stem 32 will move the chamber 41 out of register with passage 210, thereby first cutting off the charging supply to auxiliary reservoir 3 and to diaphragm chamber 30. Continued upward movement of stem 32 will move follower stem 60 upwardly, bringing valve seat 63 into contact with valve 62, thereby closing off the connection of the brake cylinder device 4 to atmosphere as previously described, and then connecting said brake cylinder device 4 to auxiliary reservoir 3 by way of ports 80 and 76 consecutively in that order, as previously described. In this case, however, fluid under pressure supplied to brake cylinder device 4 will not be supplied to chamber 48 also. Consequently brake cylinder pressure will have no effect in bringing the control portion 9 to a lap position. This lap position will be attained by substantial equalization of brake pipe and auxiliary pressures acting on opposite sides of diaphragm 27 in the manner of the well-known triple valve such as that shown and described in Instruction Pamphlet No. 5030 for the "K" triple valve, issued in January, 1938 by The Westinghouse Air Brake Company, Wilmerding, Pennsylvania.

In effecting a release of a brake application in the usual manner, fluid under ppressure supplied from the brake pipe 2 to passage 14 will flow to chamber 30 through passage 211, and also through chamber 33 and passage 31. When brake pipe pressure in chamber 30 acting on the upper side of diaphragm 27 is increased slightly in excess of auxiliary reservoir pressure and pressure of spring 34 acting on the lower side of said diaphragm, the follower stems 32 and 60 will move downwardly, as in Fig. 1, moving valve seat 63 out of contact with valve 72 and thereby connecting brake cylinder device 4 to atmosphere by the route previously described in connection with Fig. 1. Following this, chamber 41 will be moved into register with passage 210 to again supply fluid under pressure from the brake pipe 2 to the auxiliary reservoir 3. Since brake cylinder pressure has no part in effecting a release, as well as an application, of the brakes, there will be no tendency on the part of the control portion 9 to go to a lap position by a balancing between brake cylinder and brake pipe pressures on one side against control reservoir pressure on the other side. Consequently, a release of the brakes will continue while auxiliary reservoir 3 is charging to a pressure substantially equal to brake pipe pressure.

Now when it is desired to make the brake apparatus shown in Fig. 2 to operate as a European brake apparatus, such as that shown in Fig. 1, a control reservoir may be connected to passage 29, and passage 205 may be blocked off from auxiliary reservoir pipe 101 so that control reservoir pressure is again effective in chamber 28. Also, a choke plug may be placed in passage 211 to block off the direct connection of chamber 30 to brake pipe so that controlled charging only will be permitted by way of chamber 33 and passage 31 when the relative pressures are such as to permit chamber 33 to register with passage 14. Also, choke plug 209 may be removed so that passage 42 will again register with chamber 41 to permit charging of auxiliary reservoir 3 in release lap position of follower stem 32. Also, fluid at brake cylinder pressure may be made effective in chamber 48 by removing plug 209 and closing atmospheric passage 208 with a plug (not shown) mounted in screw-thread means 212. Thus brake cylinder pressure will again be effective in obtaining a graduated release.

DESCRIPTION OF FIG. 3

Figure 3:
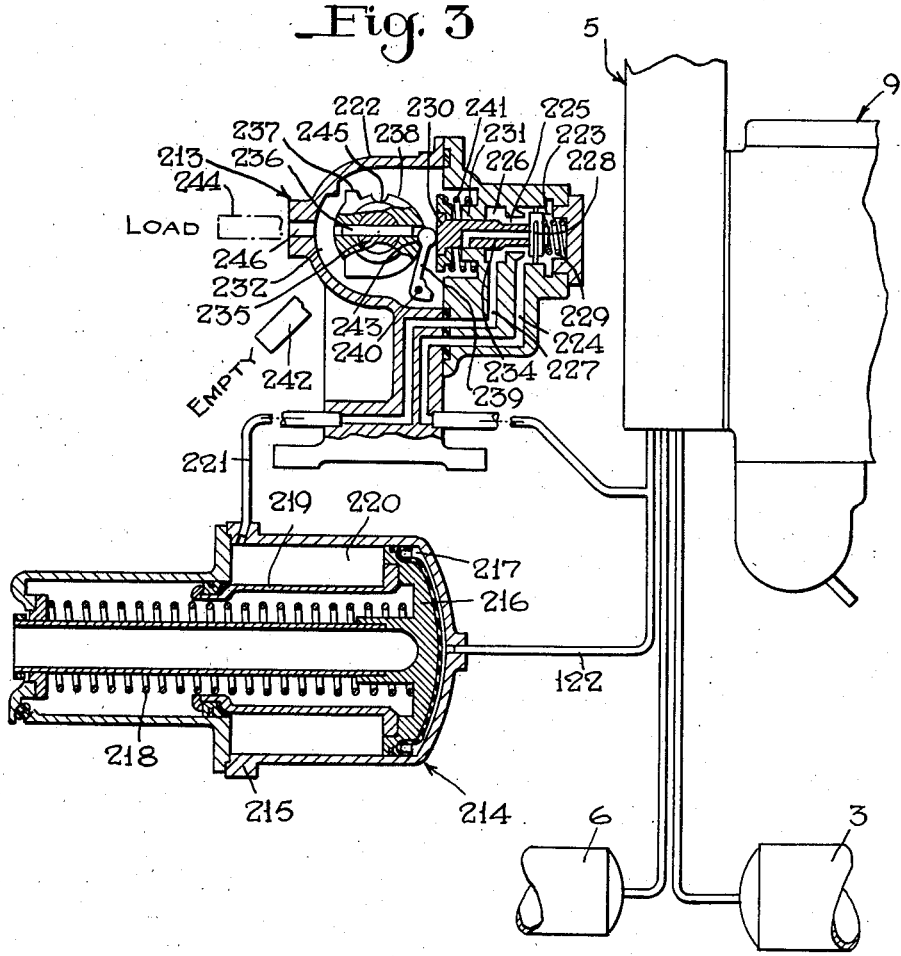
Fig. 3 is a diagrammatic view, partly in section and partly in outline, of a portion of the embodiment shown in Fig. 1 adapted to provide for empty car or loaded car braking by manual selection.

The brake apparatus shown in Fig. 3 comprises a manually operable changeover valve device 213 and a brake cylinder device 214 with the brake apparatus shown in Fig. 1 to provide a manually selective empty and load European type brake equipment.

The brake cylinder device 214 may comprise a casing 215 containing a piston 216, at one side of which is the usual pressure chamber 217, open to pipe 122, in which fluid under pressure may act on said piston to move same outwardly for applying the brakes. Upon release of fluid under pressure from chamber 217, a return spring 218 is adapted to move piston 216 inwardly to a brake release position in which it is shown in Fig. 3 of the drawings. A cylinder 219 encircling return spring 218 and attached at one end to piston 216 and slidably mounted adjacent its opposite end in the casing 215 combines with said piston and casing to define a load compensating chamber 220, provided for the purpose of receiving fluid under pressure from the changeover valve device 213 by way of pipe 221 to oppose the action of fluid under pressure in chamber 217 on piston 216. With a loaded vehicle, chamber 220 will be connected to atmosphere by the changeover valve device 213, as will be described later, in order that the brakes on the vehicle will be applied to a degree governed solely by pressure of fluid in chamber 217 acting on piston 216. With a vehicle empty a pressure of fluid will be provided in chamber 220 equal to that in the chamber 217, whereby the degree of braking of the empty vehicle will be limited to the differential in opposing fluid forces acting on piston 216.

The changeover valve device 213 comprises a casing 222 having a valve chamber 223 constantly connected by way of passage 224 to a branch of brake cylinder pipe 122 and may be connected by way of a bore 225 to a chamber 226 formed in said casing and connected through a passage 227 to pipe 221 leading to load compensating chamber 220 in the brake cylinder device 214. Contained in the chamber 223 is a valve 228 for controlling communication through the bore 225, which valve is urged toward its seated position by a spring 229 contained in said chamber. A plunger 230 for actuating valve 228 is slidably mounted in a suitable bore in a partition wall 231 dividing chamber 226 from a chamber 232 formed in casing 222 and open to atmosphere through a vent port 246. The plunger 230 is provided with a longitudinal passage 234, one end of which may be connected at one side of the plunger to chamber 232 and the other end of which may be opened to chamber 223 and closed by contact of valve 228 with the right-hand end of the plunger, as viewed in the drawing.

A shaft 235 is rotatably mounted in the casing 222 with its inner end extending into chamber 232 and having secured thereto by means of a pin 236 a cam portion 237. An inclined surface 238 of said cam portion 237 is adapted to be engaged by the free end of a bearing portion 239 which is pivotally mounted at its other end on a pin 240 anchored in the casing 222. The side of the free end opposite to that engaging the cam surface 238 abuts the plunger 230 which is held in said abutting contact by a spring 241 contained in chamber 232. A handle, not shown but indicated at the solid line 242, is rigidly attached to the shaft 235 by means not shown and is positioned for obtaining the requisite braking force for an empty vehicle, the position being indicated to the operator by the free end of the bearing portion 239 seating in a notch 243 formed in the cam surface 238. The handle position for braking a loaded vehicle is indicated at the broken line 244, in which position the free end of bearing portion 239 rests in a notch 245.

With the handle of the changeover valve device 213 positioned at 242, as shown in Fig. 3, for braking an empty vehicle the plunger 230 is held by the cam 237 through the medium of the bearing portion 239 in contact with the valve 228 which serves under the pressure of spring 229 to close the outer end of passage 234 so that fluid under pressure in chamber 223 may not flow to atmosphere by way of said passage, chamber 232 and an atmospheric vent port 246. When an application of the brakes is effected fluid under pressure is supplied through brake cylinder pipe 122 to chamber 217 in the brake cylinder device 214. Fluid under pressure thus supplied to pipe 122 also flows through passage 224 to chamber 223 and thence by way of bore 225, chamber 226, passage 227 and pipe 221 to load compensating chamber 220 in the brake cylinder device 214. Thus, for an empty vehicle the braking power for any degree of brake application will be limited, with respect to a loaded vehicle by an equal fluid pressure acting on the area of piston 216 surrounding the cylinder 219 in opposition to the brake applying force created by the pressure of fluid in chamber 217 acting on the full area on the opposite side of piston 219.

With the handle of the changeover valve device 213 positioned at 244 for braking a loaded vehicle the free end of the bearing portion 239 will be seated in the notch 245 in the cam surface 238, in which position spring 241 will be permitted to hold the plunger 230 out of contact with valve 228 and spring 229 will be permitted to seat the valve 228. In this position of the plunger 230 load compensating chamber 220 of the brake cylinder device 214 will be connected to atmosphere through pipe 221, passage 227, chamber 226, passage 234 in said plunger, chamber 232 and vent port 246. With the load compensating chamber 220 vented to atmosphere, the degree of braking of the loaded vehicle will be governed solely by the pressure of fluid in chamber 217 acting on piston 216.

DESCRIPTION OF FIG. 4

Figure 4:
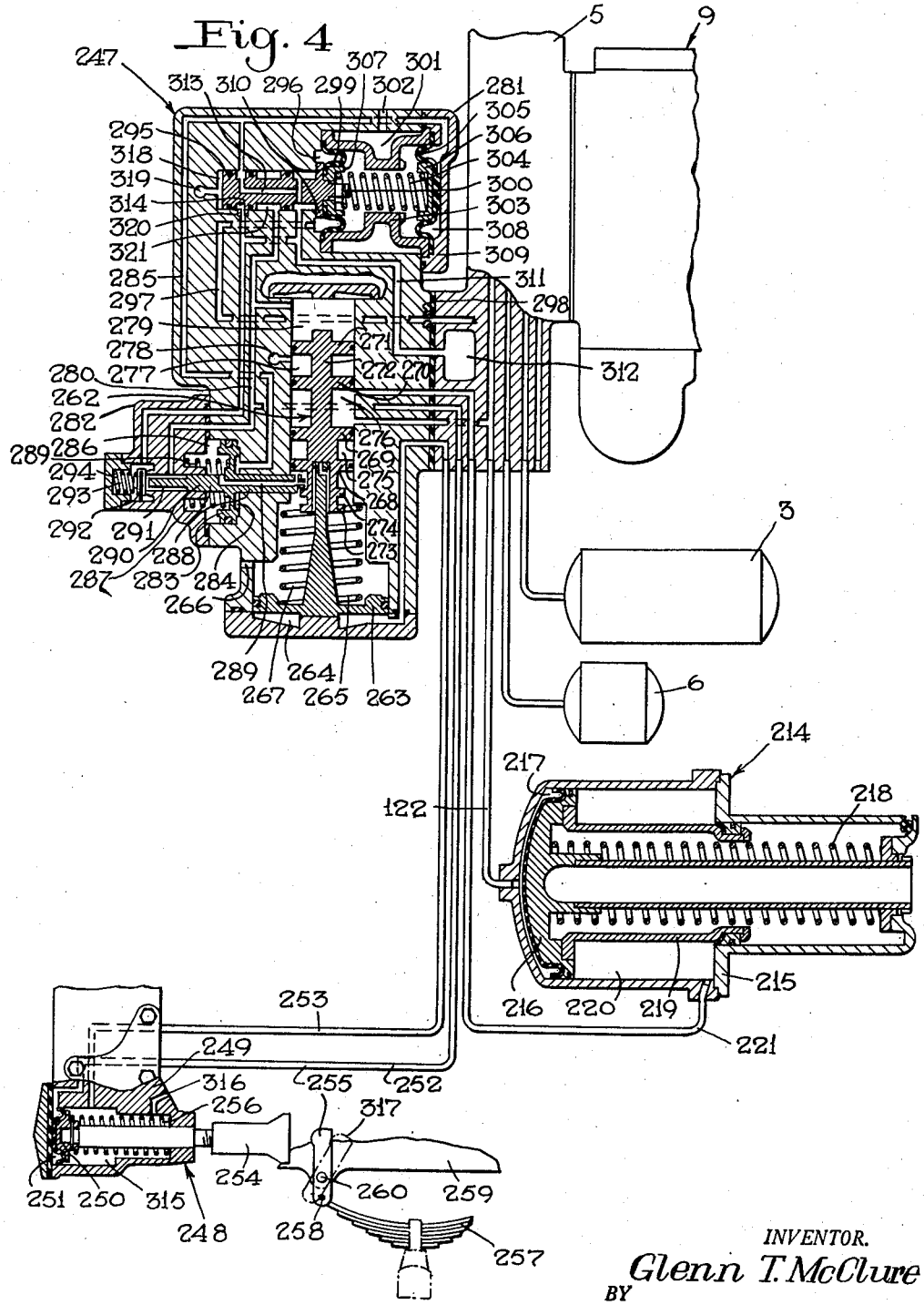
Fig. 4 is a diagrammatic view, partly in section and partly in outline of a portion of the embodiment shown in Fig. 1 adapted to provide for empty car or loaded car braking by automatic selection.

The brake apparatus shown in Fig. 4 combines the structure shown in Fig. 1 and a brake cylinder device 214 of the type shown in Fig. 3 with an automatic changeover valve device 247 and a strut device 248 for determining the operation of device 247 to automatically control the empty and load operation of the brakes.

For illustrative purposes the brake cylinder device 214 may be the same as that shown in Fig. 3 and the various parts thereof are therefore indicated by the same reference numerals.

The strut device 248 comprises a casing 249 containing a horizontally movable piston 250, at the left-hand side of which, as viewed in Fig. 4, is a pressure chamber 251 constantly open to a pipe 252 and also adapted to be opened by piston 250 to a pipe 253 in the outermost position of said piston. Projecting outwardly from the righthand side of the piston 250 is a rod 254 terminating outside the casing 249 adjacent a rockable stop member 255. A spring 256 contained in the casing 249 acts on piston 250 for urging it inwardly to the position in which it is shown in the drawing.

The strut device 248 is shown adapted to be mounted on a bogie, or single-truck, car similar to the type employed in Europe, in which a leaf type spring 257 is used for support of the car body. One end of this spring 257 is pivotally connected by means of a pin 258 to the stop member 255 which serves as a spring shackle, being rockably mounted on a portion 259 of the car body by means of a pin 260. The upper end of the stop lever 255 is disposed adjacent the outer end of the piston rod 254 in such a manner that, as the load increases, the stop lever 255 is rocked in a clockwise direction about the pin 260 carrying the upper end of said stop lever in a direction away from the piston rod. When the load on the car has been increased sufficiently to require increased braking forces, the stop lever 255 will have rocked far enough to permit piston 250 to travel in its outward movement against spring 256 in response to pressure of fluid supplied through pipe 252 sufficiently to connect said pipe to pipe 253.

The changeover valve device 247 comprises a casing 261 having slidably mounted therein a piston valve assemblage 262 arranged to be actuated by a piston 263 also slidably mounted in said casing. At one side of piston 263 is a pressure chamber 264 which is connected to chamber 251 in strut device 248 by way of pipe 252 and at the other side is a chamber 265 which is open to atmosphere through a vent port 266 and contains a spring 267 which constantly urges piston 263 outwardly toward its empty position, in which it is shown in the drawing. The piston valve assemblage 262 comprises a plurality of pistons 268, 269, 270 and 271 formed integrally on a common stem 272 with which is also formed at its outer end a pair of annular locking collars 273, 274 in axial alignment with said pistons. A chamber 275 lies between pistons 268 and 269 and is arranged when in load position to bottle up the branch of passage 122 leading to the changeover valve device 247. A chamber 276 lies between pistons 269 and 270 and is arranged to connect pipe and passage 122 to pipe and passage 221 in empty position of stem 272 and to connect pipe 221 to atmosphere in load position. A chamber 277 lies between pistons 270 and 271 and is arranged to be open to atmosphere via a vent port 278 in empty position and to prevent leakage between chamber 276 and a chamber 279 at the outer side of piston 271, the latter chamber being constantly connected to a fluid pressure supply passage 280.

The changeover valve device 247 further comprises a cut-off valve device 281 and a locking mechanism 282 which comprises a piston 283 slidably mounted in the casing 261 and having at its inner side a chamber 284 which is open to a passage 285 leading to cut-off valve device 281 and at its outer side a chamber 286 which is open to atmosphere through a passage 287, formed in a stem 288 for said piston, chamber 265 and vent port 266. Contained in chamber 286 is a spring 289 which constantly urges piston 283 and thereby stem 288 toward a position for locking relation with one or both of collars 273, 274 as the case may be. The outer end of the stem 288 extends through chamber 286 and is slidably mounted in a bore 290 with which it takes part in defining a chamber 291 which is open to passage 280 leading to cut-off valve device 281. A check valve 292 is arranged to close communication between chamber 291 and a chamber 293 and be unseated by the upper end of stem 288 upon outward movement of piston 283. A spring 294 contained in chamber 293 urges check valve 292 inwardly toward its seated position.

The cut-off valve device 281 comprises a piston valve 295 contained in a chamber 296 formed in a portion of the casing 261 and which is in constant communication with brake pipe passage 14 by way of passage 297 and a choked passage 298. The chamber 296 is closed at one end by a diaphragm 299 which is secured at its center by screw-thread means 300 to one end of piston valve 295 and which at the other side aids in defining a chamber 301 open to atmosphere through a vent port 302. Contained in chamber 301 is a composite strut member 303 which aids in securing diaphragm 299 in place and supports a spring 304 interposed between said diaphragm and a somewhat larger diaphragm 305 likewise secured to said strut member as a closure for the other end of chamber 301. Strut member 303 also serves as a stop to be contacted by a follower 306 to limit the inward deflection of diaphragm 305 and by a follower 307 to limit inward deflection of diaphragm 299. At the outer side of diaphragm 305 is a chamber 308 defined in part by a cap member 309 and constantly connected to passage 285.

Whenever the pressure of fluid in brake pipe 2 is less than a chosen degree, such as ten pounds, spring 304 will deflect diaphragm 299 against such pressure in chamber 296 and thereby move piston valve 295 to a cut-in position which may be defined by the engagement of a follower plate 310, integral with said piston valve, with the casing. In this position of piston valve 295 passage 285 and diaphragm chamber 308 will be open to brake pipe 2 through chamber 296 and passages 297, 298 as previously described, and spring 304 will initially be holding the diaphragm 305 in the position in which it is shown in the drawing.

In initially charging brake pipe 2 with fluid under pressure, or upon charging said brake pipe following venting thereof to any pressure less than, for example, ten pounds, fluid under pressure from said brake pipe will flow to passage 14 in the manner described in connection with Fig. 1, whence it will flow through choked passage 298 and passage 297 to valve chamber 296 in the cut-off valve device 281 and thence through a passage 311 to a volume reservoir 312 and to chamber 293 in the locking mechanism 282. Fluid under pressure thus supplied to chamber 296 also flows through a passage 313 in piston valve 295 to an annular recess 314 in said valve, whence it flows through passage 285 to diaphragm chamber 308 and to piston chamber 284 in the locking mechanism 282. When a sufficient pressure of fluid is thus obtained in piston chamber 284 to overcome the opposing pressure of spring 289 on piston 283, said piston will move outwardly against said spring, carrying stem 288 out of locking relation with collars 273, 274 on stem 272 to be followed by unseating of check valve 292 by the upper end of stem 288. Upon opening of check valve 292, the volume of fluid under pressure present in reservoir 312 will suddenly become effective by way of passage 311, chamber 293, past check valve 292 and passage 280 in chamber 279 at the upper side of piston 271, as viewed in the drawing, thus insuring downward movement of piston 263 to the position in which it is shown in the drawing, chamber 264 being connected to atmosphere through passage 253, a chamber 315 and a vent port 316 in strut device 248. Fluid under pressure supplied to passage 280 will also flow to chamber 251 in the strut device 248 and will move piston 250 outwardly against the pressure of spring 256 until such movement is stopped by contact between piston rod 254 and stop lever 255.

If the vehicle is empty, this movement of piston 250 will be so limited as not to open pipe 252 to pipe 253 through chamber 251, whereby piston chamber 264 in the automatic changeover valve device 247 will not be supplied with fluid under pressure from chamber 251 and the stem 272 will be held in its empty position, corresponding to the empty condition of the vehicle, by pressure of fluid in chamber 279 and pressure of spring 267 in chamber 265.

If the vehicle is loaded, the spring 257 will be so disposed relative to the car body 259 as to extend the spring horizontally and rock the lever 255 clockwise to a position indicated by a broken line 317, in which the piston 250 will be permitted to move outwardly far enough to connect chamber 251 to pipe 253. Fluid under pressure supplied to chamber 251 will flow through pipe 253 to chamber 264 where it will act on piston 263 to urge said piston in an inward direction. When the pressure of fluid in chamber 264 becomes sufficient to overcome the opposing pressure of spring 267 and of fluid in chamber 279, piston 263 will move inwardly actuating the piston valve assemblage 262 to load position in which brake cylinder pipe 122 will be cut off from load compensating pipe 221 by piston 269, and pipe 221 will be connected to atmosphere through chamber 276 and vent port 278.

While the piston valve assembly 262 is being adjusted, as above described, the pressure of fluid in brake pipe 2, valve chamber 296 and diaphragm chamber 308 will be gradually increasing. This increase in pressure in chamber 308 acting on diaphragm 305 will cause same to deflect against spring 304 for correspondingly increasing the pressure of said spring against diaphragm 299 to hold the diaphragm 299 against movement in response to the increasing pressure in chamber 296. Such deflection of diaphragm 305 will continue until the pressure in the brake pipe 2 and acting on diaphragm 299 is increased to a chosen degree, such as forty pounds, when it will be stopped by contact of follower 306 with strut member 303. Further increase in pressure in brake pipe 2 and chamber 296 will then deflect diaphragm 299 against spring 304 until stopped by engagement of follower 307 with strut member 303, such deflection of diaphragm 299 being sufficient to move piston valve 295 to a cut-off position.

In the cut-off position of piston valve 295 fluid under pressure in chambers 284 and 308 will be connected to atmosphere through passage 285, a chamber 318 and a vent port 319. Fluid under pressure in reservoir 312 and chamber 293 will flow to atmosphere at a relatively slower rate by way of pipe 311, a choke 320, chamber 318 and vent port 319. Fluid under pressure in chambers 291 and 279 will be connected to atmosphere through pipe 280, a recess 321 in piston valve 295 and pipe 311. Fluid under pressure in chamber 251 of the strut device 248 will be vented to atmosphere through pipe 252, passage 280, recess 321, passage 311, choke 320, chamber 318 and vent port 319. The venting of piston chamber 284 will permit spring 289 to actuate the stem 288 inwardly into a position of locking relation with the collars 273, 274. If the piston assemblage 262 is positioned for empty braking, the stem 288 will be positioned above collar 274. If the piston assemblage is positioned for load braking, the stem 288 will be disposed below the collar 273. Venting of diaphragm chamber 308 will permit the spring 304 to move the diaphragm 305 to the position in which it is shown in the drawing for reducing pressure of said spring to such a degree that diaphragm 299 and piston valve 295 will remain in the cut-off position until brake pipe pressure in chamber 296 is reduced, subsequently, to a relatively lower pressure, such as ten pounds.

With the piston assemblage 262 positioned for braking an empty car as shown in Fig. 4, fluid under pressure supplied via passage and pipe 122 to the brake cylinder pressure chamber 217 by operation of the brake controlling valve device 9, as previously described, will flow through chamber 276 in the load compensating mechanism 282 and pipe 221 to load compensating chamber 220 in the brake cylinder device 214. Thus, for an empty car the braking power for any degree of brake will be limited, with respect to a loaded or partially loaded vehicle by an equal fluid pressure acting on the area of piston 216 surrounding the cylinder 219 in opposition to the brake applying force created by the pressure of fluid in chamber 217 acting on the full area on the opposite side of the piston 216.

When the piston assemblage 262 is positioned for braking a loaded car, the collars 273, 274 will be located above the piston stem 288, in which position pipe 221 will be cut off from pipe 122 by piston 269 and pipe 221 will be connected to atmosphere by way of chamber 276 and vent port 278, thereby venting the load compensating chamber 220 to atmosphere. With chamber 220 vented to atmosphere, the degree of braking of a loaded car will be governed solely by the pressure of fluid in chamber 217 acting on piston 216.

DESCRIPTION OF FIG. 5

Figure 5:
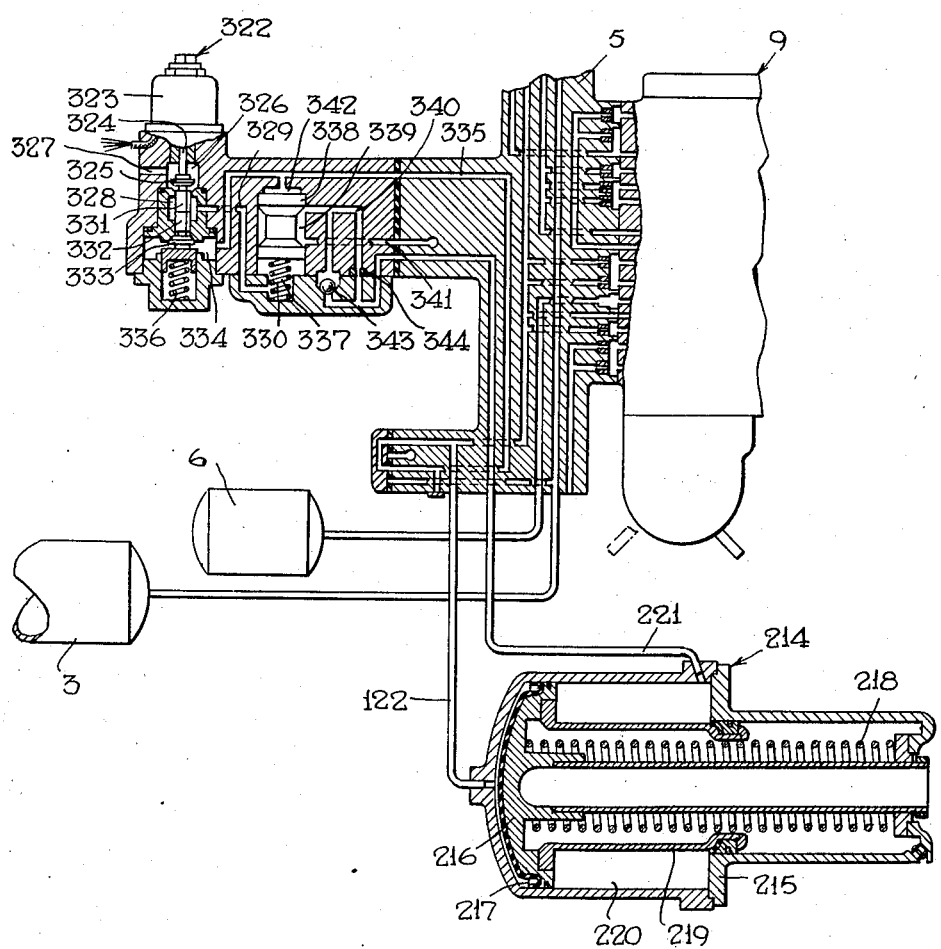
Fig. 5 is a diagrammatic view, partly in section and partly in outline, of a portion of the embodiment shown in Fig. 1 adapted to provide for speed-controlled braking; and, Fig. 6 is a diagrammatic view of another embodiment of invention which provides for braking on both trucks of a railway car.

The structure shown in Fig. 5 is provided for the purpose of reducing the braking forces on a car as the train speed reduces and to that end differs from the structure shown in Fig. 1 in that a compensating type brake cylinder device 214, as shown in Fig. 3, is employed in place of brake cylinder 1 in combination with a magnet valve device 322 which controls the supply and release of fluid under pressure to the compensating chamber 220 of said device according to the speed of the train. This magnet valve device 322 maintains the compensating chamber 220 vented to atmosphere when the train is being operated at high speeds and connects same to the brake cylinder pipe 122 when the train speed is reduced to a given value so as to reduce the braking forces as the train speed is reduced.

The magnet valve device 322 comprises a solenoid 323 which is adapted to be energized by speed controlled switch means (not shown) when the train speed is above a predetermined rate. An armature stem 324 for solenoid 323 is arranged to contact a valve 325 contained in a chamber 326 which is always open to atmosphere through a vent port 327 and may be connected to a chamber 328 which is always open through a passage 329 to a piston chamber 330. A stem 331 of valve 325 extends into chamber 328 where it contacts a stem 332 of a valve 333, which controls communication between chamber 328 and a chamber 334 in which it is contained and which is connected to brake cylinder pipe 122 through a passage 335. A spring 336 acts on valve 333 to bias said valve toward a seated position in which valve 325 is unseated. A spring 337 contained in chamber 330 biases a piston valve 338 toward a position in which a chamber 339, formed intermediate the ends of said piston valve, connects a divided passage 340 to an atmospheric passage 341. The pressure of spring 337 may be opposed by pressure of fluid in a chamber 342 at the opposite end of piston valve 338, which chamber is open to brake cylinder pipe 122 by way of passage 335. A check valve 343 permits flow of fluid under pressure only in a direction from compensating pipe 221 to passage 340 while a choke 344 provides a constant relatively restricted communication between said passages.

In operation, when the movement of the train is below a predetermined speed, the solenoid 323 will be deenergized, in which case valve 333 will be seated and valve 325 unseated by spring 336 as shown in the drawing, thereby connecting chamber 330 to atmosphere through passage 329, chamber 328, chamber 326 and vent port 327. When an application of the brakes is effected under these conditions, fluid under pressure supplied to brake cylinder pipe 122 will flow through passage 335 to chamber 342. Since chamber 330 is connected to atmosphere as just described, fluid pressure in chamber 342 will overcome the opposing pressure of spring 337 and actuate the piston valve 338 downwardly to its lowermost position in which fluid under pressure supplied to chamber 342 will flow by way of passage 340, choke 344 and passage 221 to compensating chamber 220. Consequently the effective braking power will be reduced by the pressure of fluid in chamber 220 acting in opposition to pressure in chamber 217, as previously described in connection with Figs. 3 and 4.

When the movement of the train is above a predetermined speed, the solenoid 323 will be energized, actuating the stem 324 downwardly against pressure of spring 336 to seat the valve 325 and unseat the valve 333. In this position, fluid under pressure supplied to chamber 334 from brake cylinder pipe 122 will flow through chamber 328 and passage 329 to chamber 330. With pressures in opposing chambers 330 and 342 equal spring 337 will become effective to return piston valve 338 to the position in which it is shown in the drawing. In this position piston valve 338 will cut off communication between chamber 342 and passage 340, thus disconnecting brake cylinder pipe 122 from the compensating chamber 220, and chamber 220 will be connected to atmosphere through pipe 221, past check valve 343, and through passage 340, chamber 339 and atmospheric passage 341. It will thus be seen that, fluid pressure in main pressure chamber 217 will be unopposed in effecting an application of the brakes when the train speed is above a predetermined degree. When the train speed reduces below said predetermined degree as a result of the brake application, the magnet valve 322 will operate to the position shown in the drawing, in which fluid under pressure will again be supplied to compensating chamber 220 when a brake application is effected, as described above.

DESCRIPTION OF FIG. 6

The apparatus shown in Fig. 6 differs from that shown in Fig. 1 in much the same way as does the apparatus shown in Fig. 5, with the additional difference of having another compensating type brake cylinder device 345 and an added relay valve device 346. Fluid under pressure is supplied from the auxiliary reservoir 6 to a main pressure chamber 347 of the brake cylinder device 345, operating under the control of the pressure of fluid supplied to the main pressure chamber 217 of the brake cylinder device 214. The magnet valve device 322 is speed responsive in the same manner as in Fig. 5. However, the supply of fluid under pressure for the compensating chamber 220 and a compensating chamber 348 is derived from the main supply of fluid under pressure to the brake cylinder device 345.

The relay valve device 346 comprises a diaphragm 349 clamped about its periphery between two sections of a casing 350, and combining therewith to define at one side a chamber 351 which is always open to brake cylinder pipe 122 and at the other side a chamber 352 which is always open to atmosphere by way of a vent passage 353. Contained in chamber 351 is a spring 354 which urges diaphragm 349 downwardly toward a position in which a spring 355 confined in a cage portion 356 of casing 350 is permitted to seat a release valve 357 to thereby close communication between chamber 351 and a chamber 358 which is always open to a passage 359 leading to main pressure chamber 347 in brake cylinder device 345 and to magnet valve device 322. A follower stem 360 for diaphragm 349 is provided with a collar 361 for unseating valve 357 in release position of said diaphragm. This stem 360 extends through chamber 358 and abuts a supply valve 362 which controls communication between chamber 358 and a chamber 363 which is always open to auxiliary reservoir 6 through a pipe 160. A spring 364 contained in chamber 363 opposes downward movement of follower stem 360 which will unseat supply valve 362.

In operation, fluid under pressure supplied to chamber 217 for effecting an application of the brakes also flows to chamber 351 in the relay valve device 346. Upon a certain degree of fluid pressure being attained in chamber 351 diaphragm 349 will deflect downwardly against the opposing force of spring 364 permitting spring 355 to seat the release valve 357 and thereafter unseating supply valve 362. Fluid under pressure supplied from auxiliary reservoir 6 will then flow through chamber 358 and passage and pipe 359 to main pressure chamber 347 in brake cylinder device 345 and will also flow by way of passage 335 to chambers 334 and 342 in the magnet valve device 322. With the magnet valve device 322 conditioned for braking a car operating at low speed chamber 330 is connected to atmosphere through passage 329, chambers 328, 326 and vent port 327 as shown in the drawing. Fluid under pressure supplied to chamber 342 will actuate piston valve 338 against pressure of spring 337 to its lowermost position in which fluid under pressure will flow from chamber 342 through passage 340, choke 344 and passage and pipe 221 to compensating chambers 220 and 348 of the brake cylinder devices 214 and 345, respectively. In the same manner as previously described in connection with Fig. 6, fluid pressure in chambers 220 and 348 will reduce the braking power of brake cylinders 214 and 345 to provide suitable braking for a car operating in the low speed range.

With the magnet valve device 322 conditioned for braking a car operating at high speed, fluid under pressure supplied to chamber 334 will flow past valve 333 to chamber 328, and thence through passage 329 to chamber 330. With fluid pressures on the opposite ends of piston valve 338 being equal spring 337 will be effective in holding said valve in the position in which it is shown in the drawing, in which position compensating chambers 220 and 343 will be vented to atmosphere through passage 221, past check valve 343, passage 340, chamber 339 and vent passage 341. Thus, fluid pressure in chambers 217 and 347 will be fully effective to provide suitable braking for a car operating in the high speed range.

SUMMARY

It will now be seen that I have provided a brake controlling valve device of the graduated release type which uses a control reservoir as a standard for gauging the degree of brake application according to the amount of brake pipe reduction, which will also provide for as uniform as possible application of brakes throughout a train with minimum time interval between the start of application at the front and rear of the train and also a minimum time interval on each car between the initiation of the reduction in brake pipe pressure and obtaining effective braking, which will also provide for maintenance of brake cylinder pressure from the auxiliary reservoir 6 and, after equalization of pressures in auxiliary reservoir and brake cylinder device, then from brake if a predetermined rate is not exceeded, and which also provides for substantially uniform recharging of brake equipments and release of brakes throughout a train. Moreover, the brake equipment is particularly adapted for use in trains where a number of cars may not be brake equipped or equipped with brakes which are cut out, the equipment ensuring obtaining the above results even in such trains.

Having now described the invention, what I claim as new and desire to secure by Letters Patent, is:

1. In a fluid pressure brake apparatus, in combination, a brake pipe, a brake cylinder device, an inshot communication for conveying fluid under pressure to and from said brake cylinder device, valve means controlled by pressure of fluid in said brake pipe and an opposing pressure operative upon a reduction in brake pipe pressure relative to said opposing pressure to establish a quick service communication for effecting a venting of fluid under pressure from said brake pipe, a control reservoir, valve means responsive to release of fluid under pressure from a chamber to establish a connection between said brake pipe and control reservoir for charging said reservoir with fluid under pressure from said brake pipe and operative by pressure of fluid in said chamber to disestablish said connection, an inshot valve device controlled by pressure of fluid in said brake cylinder device and operative when such pressure is less than a chosen degree to supply fluid under pressure from said quick service communication to said chamber and to connect said inshot communication to said brake cylinder device and operative when brake cylinder pressure is in excess of a chosen degree to close off both said quick service communication and said inshot communication, and a restricted communication constantly connecting said chamber to said brake cylinder device.

2. In a fluid pressure brake apparatus, in combination, a brake pipe, a brake cylinder device, an inshot communication for conveying fluid under pressure to and from said brake cylinder device, a quick service reservoir, valve means controlled by pressure of fluid in said brake pipe and an opposing pressure operative upon a reduction in brake pressure relative to said opposing pressure to establish a quick service communication for venting fluid under pressure from said brake pipe to said quick service reservoir, a control reservoir, valve means responsive to release of fluid under pressure from a chamber to establish a charging communication between said brake pipe and control reservoir for charging said reservoir with fluid under pressure from said brake pipe and operative by fluid under pressure in said chamber to close said charging communication, an inshot valve device controlled by pressure of fluid in said brake cylinder device and operative when such pressure is less than a chosen degree to supply fluid at the pressure of fluid in said quick service reservoir to said chamber and to connect said inshot communication to said brake cylinder device and operative when brake cylinder pressure is in excess of a chosen degree to close both said quick service communication and said inshot communication, and a restricted communication constantly connecting said chamber to said brake cylinder device.

3. In a fluid pressure brake apparatus, in combination, a brake pipe, a brake cylinder device, a brake cylinder passage means through which fluid under pressure may be conveyed to and from said brake cylinder device, a brake controlling valve device operative upon a reduction in brake pipe pressure to supply fluid under pressure to said passage means and upon an increase in brake pipe pressure to release fluid under pressure from said passage means, flow restricting means in said brake cylinder passage means, an inshot communication in by-passing relation to said flow restricting means, a quick service reservoir, valve means controlled by pressure of fluid in said brake pipe and an opposing pressure operative upon a reduction in brake pipe pressure relative to said opposing pressure to establish a quick service communication for discharging fluid under pressure from said brake pipe to said quick service reservoir, a control reservoir, valve means responsive to release of fluid under pressure from a chamber to establish a charging communication between said brake pipe and control reservoir for charging said reservoir with fluid under pressure from said brake pipe and operative by pressure of fluid in said chamber to close said charging communication, an inshot valve device controlled by pressure of fluid in said brake cylinder device and operative when such pressure is less than a chosen degree to connect said quick service reservoir to said chamber and to connect said inshot communication to said brake cylinder device and operative when brake cylinder pressure is in excess of a chosen degree to close said quick service communication and said inshot communication, and choke means connecting said brake cylinder passage means to said chamber.

4. In a fluid pressure brake apparatus, in combination, a brake pipe, a brake cylinder device, an auxiliary reservoir, a brake controlling valve device controlled by pressure of fluid in said brake pipe and an opposing pressure and operative upon a chosen reduction in brake pipe pressure relative to said opposing pressure to supply fluid under pressure from said auxiliary reservoir to said brake cylinder device and upon an increase in brake pipe pressure to connect said brake cylinder device to atmosphere, an inshot valve device controlling a fluid pressure supply communication to said brake cylinder device and operative by a chosen brake cylinder pressure to close said communication and in response to a lesser brake cylinder pressure to open said communication, a constantly open relatively restricted communication in by-passing relation to said inshot valve device, a quick service valve device controlled by brake pipe pressure and an opposing pressure operative in response to less than said chosen reduction in brake pipe pressure to establish a communication for effecting a quick service reduction in pressure in said brake pipe, a control reservoir, charging valve means having a normal position in which said brake pipe is connected to said reservoirs and operative in response to pressure of fluid in a chamber to a cut-off position in which said brake pipe is disconnected from said reservoirs, valve means controlled by said inshot valve device for supplying fluid under pressure from the last named communication to said chamber when the pressure in said brake cylinder device is of said lesser degree and to terminate such supply from the last named communication when the pressure in said brake cylinder device is in excess of a chosen degree, and a restricted communication constantly connecting said chamber to said brake cylinder device.

5. In a fluid pressure brake apparatus, in combination, a brake pipe, a brake cylinder device, a brake controlling valve device controlled by pressure of fluid in said brake pipe and an opposing pressure and operative upon a chosen reduction in brake pipe pressure relative to said opposing pressure to supply fluid under pressure to said brake cylinder device, an inshot valve device controlling a fluid pressure supply communication to said brake cylinder device and operative by a chosen brake cylinder pressure to close said communication and in response to a lesser brake cylinder pressure to open said communication, a constantly open relatively restricted communication in by-passing relation to said inshot valve device, a quick service valve device controlled by brake pipe pressure and an opposing pressure operative in response to a reduction less than said chosen reduction in brake pipe pressure to establish a quick service communication for effecting a quick service reduction in pressure in said brake pipe, a control reservoir, an auxiliary reservoir, charging valve means including a chamber always open to auxiliary reservoir and having one position in which said brake pipe is connected through a port to said chamber and said chamber is connected through a relatively restricted port to said control reservoir and operative in response to pressure of fluid in a control chamber to another position in which said ports are closed, valve means controlled by said inshot valve device for connecting said quick service communication to said control chamber when the pressure in said brake cylinder device is of said lesser degree and to close said quick service communication when the pressure in said brake cylinder device is in excess of a chosen degree, and choke means connecting said brake cylinder device to said control chamber.

6. In a fluid pressure brake apparatus, in combination, a brake pipe, a brake cylinder device, an auxiliary reservoir, a control reservoir, a brake controlling valve device controlled by pressure of fluid in said brake pipe and said brake cylinder device acting in opposition to pressure of fluid in said control reservoir and operative in response to a reduction in brake pipe pressure to supply fluid under pressure from said auxiliary reservoir to said brake cylinder device, charging valve means including a chamber always open to auxiliary reservoir and having one position in which said brake pipe is connected through a port to said chamber and said chamber is connected through a relatively restricted port to said control reservoir and operative in response to pressure of fluid in a control chamber to another position in which said ports are closed, choke means connecting said brake cylinder device to said control chamber, and a limiting valve device normally establishing communication between said auxiliary reservoir and said brake controlling valve device and operative in response to a certain degree of pressure in said brake cylinder device to disestablish said communication.

7. In a fluid pressure brake apparatus, in combination, a brake pipe, a brake cylinder device, an auxiliary reservoir, a control reservoir, a brake controlling valve device controlled by pressure of fluid in said brake pipe and said brake cylinder device acting in opposition to pressure of fluid in said control reservoir and operative in response to a reduction in brake pipe pressure to supply fluid under pressure from said auxiliary reservoir to said brake cylinder device, charging valve means having one position in which said brake pipe is connected to said auxiliary reservoir and operative in response to pressure of fluid in a chamber to another position in which said brake pipe is cut off from said reservoir, choke means connecting said brake cylinder device to said chamber, a quick service valve device operative at one time to establish a communication for effecting a quick service reduction in brake pipe pressure, valve means operative at said one time to connect said communication to said chamber and at another time to cut off said connection, and a limiting valve device normally establishing communication between said auxiliary reservoir and said brake controlling valve device and operative in response to a certain degree of pressure in said brake cylinder device to disestablish said communication.

8. In a fluid pressure brake apparatus, in combination, a brake pipe, a brake cylinder device, an auxiliary reservoir, a control reservoir, a brake controlling valve device controlled by pressure of fluid in said brake pipe and said brake cylinder device acting in opposition to pressure of fluid in said control reservoir and operative in response to a chosen reduction in brake pipe pressure to supply fluid under pressure from said auxiliary reservoir to said brake cylinder device, charging valve means having a chamber and operative responsively to venting of said chamber to one position in which said brake pipe is connected to said auxiliary reservoir and said control reservoir and operative in response to pressure of fluid in said chamber to another position in which said brake pipe is cut off from said reservoirs, choke means connecting said brake cylinder device to said chamber, a quick service valve device controlled by brake pipe pressure and an opposing pressure operative in response to a reduction less than said chosen reduction to establish a quick service communication for effecting a quick service reduction in said brake pipe pressure, valve means for connecting said quick service communication to said chamber only when pressure of fluid in said brake cylinder device is below a predetermined degree, and a limiting valve device normally permitting flow from said auxiliary reservoir to said brake controlling valve device and operative in response to a certain degree of pressure in said brake cylinder device, greater than said predetermined degree, to prevent such flow.

9. In a fluid pressure brake apparatus, in combination, a brake pipe, a control reservoir, an auxiliary reservoir, a brake cylinder device, a brake controlling valve device controlled by pressure of fluid in one chamber acting in conjunction with pressure of fluid in a second chamber and in opposition to pressure of fluid in a third chamber and comprising valve means operative upon a reduction in pressure of fluid in said one chamber relative to the pressure of fluid in said third chamber to an application position to connect said auxiliary reservoir to said brake cylinder device, operative upon a substantial restoration of pressure in said one chamber to a release position to connect said brake cylinder device to atmosphere and operative upon brake cylinder pressure effecting a balance in the aforesaid pressures to an intermediate lap position in which both of said connections are closed, one conduit for conducting fluid under pressure supplied by said valve means from said one chamber to said auxiliary reservoir when said valve means is in release position or lap position and adapted to be cut off by said valve means upon movement from lap position to said application position, a second conduit for conducting fluid under pressure supplied by said valve means from said one chamber to said auxiliary reservoir only when said valve means is in said release position and adapted to be cut off by said valve means upon movement of said valve means from said release position to said lap position, a removable plug adapted to close communication through said one conduit, one passageway connecting said brake cylinder device to said second chamber, another passageway connecting said second chamber to atmosphere, plug means adapted to close one passageway when the other passageway is open, one communication means for connecting said control reservoir to said third chamber, another communication means for connecting said auxiliary reservoir to said one communication means, plug means adapted to either close off said control reservoir from said one communication means or close off said auxiliary reservoir from said other communication means, one passage means for supplying fluid under pressure from said brake pipe to said one chamber, a second valve means for controlling supply of fluid under pressure from said one passage means to said one chamber operative upon an increase in pressure in said one chamber relative to pressure of fluid in said third chamber to throttle off said one passage means, a second passage means for connecting said one passage means to said one chamber in by-passing relation to said second valve means, and removable plug means adapted to close said second passage means.

10. In a fluid pressure brake apparatus, in combination, a brake pipe, a control reservoir, an auxiliary reservoir, a brake cylinder device, a brake controlling valve device having a casing and operable by pressure of fluid in said control reservoir upon a reduction in pressure of fluid in a chamber to supply fluid under pressure from said auxiliary reservoir to said brake cylinder device and by an increase in pressure in said chamber relative to pressure of fluid in said control reservoir to release fluid under pressure from said brake cylinder device, a conduit providing for flow of fluid under pressure from said chamber to said auxiliary reservoir, a check valve in said conduit for preventing flow of fluid under pressure from said auxiliary reservoir to said chamber, and constant pressure means biasing said check valve against flow of fluid under pressure through said conduit from said chamber to said auxiliary reservoir, two spaced apart flexible diaphragms mounted in said casing in coaxial relation to each other and subject on their respective adjacent faces to atmospheric pressure and pressure in said chamber, the first said diaphragm being subject on its opposite side to pressure of fluid in said brake cylinder device and the second said diaphragm being subject on its opposite side to pressure of fluid in said control reservoir, a stem slidably mounted in a bore in said casing and connecting said diaphragms to each other, a passageway connecting said brake pipe to said bore, said stem comprising one means controlling communication between said passageway and said chamber and a second means controlling communication between said chamber and said conduit, said one means being operative by a preponderance of force exerted by fluid pressure in said chamber and said brake cylinder device acting on the first said diaphragms over that exerted by control reservoir pressure acting on the second said diaphragm to either throttle or close the first named communication and said second means being operative only by a preponderance of control reservoir pressure to close off the second named communication.

11. In a fluid pressure brake equipment, in combination, a brake pipe, a brake cylinder device, a supply reservoir for storing fluid under pressure for supply to said brake cylinder device, a control reservoir, an initial-charging passageway connected to said brake pipe, a cutoff valve device adapted to assume a charging position connecting the control and supply reservoirs one with the other and both with said initial-charging passageway during initial charging while said brake cylinder device is devoid of fluid under pressure and to assume a lap position cutting off said reservoirs one from the other and from said initial-charging passageway while said brake cylinder device is charged with fluid under pressure, a supply reservoir recharge passageway connected to said supply reservoir, a spring-loaded check valve device having its outlet connected to said recharge passageway, and a control valve device controlling admittance of fluid under pressure from said brake pipe to the inlet of said spring-loaded check valve device, said control valve device being operative responsively to preponderance in pressure of fluid in said brake pipe over that in said control reservoir while said cutoff valve device is in its charging position to limit the pressure of fluid at said inlet to a value insufficient to unseat said check valve device and operative to permit full realization of brake pipe pressure in said inlet responsively to preponderance in pressure of fluid in said control reservoir over that in said brake pipe while said cutoff valve device is in its lap position and said brake cylinder device is pressurized with fluid admitted from said supply reservoir.

12. The combination as set forth in claim 11, including an initial-charge limiting choke interposed in said initial-charging passageway, and a recharge limiting choke interposed in said supply reservoir recharge passageway.

13. In a fluid pressure brake equipment for a railway train, in combination, a brake pipe subject during initiation of a brake release to a temporary increase in brake pipe pressure above a normal brake pipe pressure which prevails while the brakes are released, a brake cylinder device, a supply reservoir for storing fluid under pressure for supply to said brake cylinder device to effect a brake application, a control reservoir containing fluid at a datum pressure equal to said normal brake pipe pressure, a spring-loaded check valve device having its outlet connected to said supply reservoir, a control valve device controlling fluid pressure communication between the inlet to said check valve device and said brake pipe, operative, during release of fluid under pressure from said brake cylinder device, responsively to preponderance in pressure of fluid in said brake pipe over that in said control reservoir to limit the pressure of fluid in said inlet to a value substantially equal to pressure of fluid in said control reservoir, and a cutoff valve device operative upon release of fluid under pressure from said brake cylinder device to establish restricted communication between said supply reservoir and said brake pipe in by-pass of said spring-loaded check valve device.

14. In a fluid pressure brake equipment for a railway train, in combination, a brake pipe subject during initiation of a brake release to a temporary increase in brake pipe pressure above a normal brake pipe pressure which prevails while the brakes are released, a brake cylinder device, a supply reservoir for storing fluid under pressure for supply to said brake cylinder device to apply the brakes, a control reservoir containing fluid at a datum pressure equal to said normal brake pipe pressure, means, including a spring-loaded check valve device, controlling during brake release a first communication between said supply reservoir and said brake pipe, said means being operative responsively to preponderance in pressure of fluid in said brake pipe over that in said control reservoir to limit pressure of fluid attained in said supply reservoir as a result of recharge flow of fluid under pressure via said first communication to a value less than pressure of fluid in said control reservoir, and cutoff valve means operative upon release of fluid under pressure from said brake cylinder device to establish a second communication of lesser flow capacity than said first communication, between said supply reservoir and said brake pipe, independent of said first communication, to allow said reservoir to be charged to a pressure equal to the pressure carried in said control reservoir.

15. The combination as set forth in claim 14, including one choke in said first communication to prevent a too rapid drain of fluid under pressure from said brake pipe to said supply reservoir during substantial recharge of same, and another choke in said second communication to reduce the tendency for said supply reservoir to become overcharged during the final stage of its recharge when pressure in said brake pipe is above said normal brake pipe pressure.

16. The combination as set forth in claim 13, including a quick service valve device responsive to preponderance in pressure of fluid in said supply reservoir over that in said brake pipe to effect a reduction in pressure in said brake pipe sufficient to cause a brake application.

17. The combination as set forth in claim 14, including a quick service valve device responsive to preponderance in pressure of fluid in said supply reservoir over that in said brake pipe to effect a reduction in pressure in said brake pipe sufficient to cause a brake application.

18. In a fluid pressure brake apparatus, in combination, a brake pipe, a control reservoir, a supply reservoir, a brake cylinder device, a brake controlling valve device operative by pressure of fluid in said control reservoir upon a chosen reduction in brake pipe pressure to supply fluid under pressure from said supply reservoir to said brake cylinder device for effecting an application of brakes and operative upon restoration of brake pipe pressure to release fluid under pressure from said brake cylinder device, said brake controlling valve device having a pressure chamber to which fluid under pressure may be supplied from said brake pipe and from which fluid under pressure may be supplied to said reservoirs, and piston valve means interposed between said brake pipe and said pressure chamber operable by said brake controlling valve device upon a certain excess of pressure in said pressure chamber over control reservoir pressure to restrict the flow of fluid under pressure from said brake pipe to said pressure chamber according to the degree of said excess.

19. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, movable abutment means connected to said valve subject on one side to atmospheric pressure and on the opposite side to pressure of fluid in a third chamber, separate from said second chamber, and operative in response to a chosen pressure of fluid in said third chamber to effect closure of said valve, and a restricted passageway for conveying fluid under pressure from the last named portion of said other communication to said third chamber.

20. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, movable abutment means subject on one side to atmospheric pressure and having at the opposite side a valve normally closing communication between a third chamber encircling the seat for such valve and a fourth chamber within said seat and operative in response to a chosen pressure of fluid in said fourth chamber to unseat said valve, whereby pressure of fluid in said fourth chamber becomes effective in said third chamber to move said movable abutment means to a chosen position, means venting said third chamber with the last named valve seated and operative to close off such vent upon movement of said abutment means to said chosen position, means responsive to movement of said abutment means to said chosen position to seat said inshot valve, and a restricted communication connecting said fourth chamber to the last named portion of said other communication.

21. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, a flexible diaphragm subject on one side to atmospheric pressure and at the opposite side to pressure of fluid in a third chamber, a normally seated disc-like valve loosely associated with the opposite side of said diaphragm controlling communication between said third chamber which encircles the seat for such valve and a fourth chamber encircled by said seat, and unseatable by a chosen pressure of fluid in said fourth chamber to open said fourth chamber to said third chamber whereby pressure of fluid becomes effective over the fuel area of said opposite side of said diaphragm to deflect same to a chosen position, valve means normally venting said third chamber and operative by movement of said diaphragm to said chosen position to close such vent, means responsive to deflection of said diaphragm to said chosen position to close said inshot valve, and a restricted communication connecting said fourth chamber to the last named portion of said other communication.

22. In a fluid pressure brake apparatus, in combination, a brake pipe, means operable by fluid under pressure to effect application of brakes, brake controlling means operable upon a reduction in brake pipe pressure to supply fluid under pressure to the fluid pressure operable means, two communications through which said fluid under pressure flows from said brake controlling means to said fluid pressure operable means, choke means in one of said communications, and an inshot valve device controlling the other of said two communications comprising an inshot valve disposed in a first chamber open to the portion of such communication connected to said brake controlling means and adapted to seat to close said first chamber from a second chamber open to the portion of such communication which is connected to said fluid pressure operable means, a flexible diaphragm subject on one side to atmospheric pressure and at the opposite side to pressure of fluid in a third chamber, a normally seated disc-like valve loosely associated with the opposite side of said diaphragm controlling communication between said third chamber which encircles the seat for such valve and a fourth chamber encircled by said seat, and unseatable by a chosen pressure of fluid in said fourth chamber to open said fourth chamber to said third chamber whereby pressure of fluid becomes effective over the fuel area of said opposite side of said diaphragm to deflect same to a chosen position, a stem connected to said diaphragm and movable therewith in a bore, a passageway in said stem constantly open at one end to said third chamber and at the opposite end to atmospheric pressure at said one side of said diaphragm with said disc valve seated and closed by the wall of said bore upon deflection of said diaphragm to said chosen position, means responsive to deflection of said diaphragm to said chosen position to close said inshot valve, and a restricted communication connecting said fourth chamber to the last named portion of said other communication.

23. In a fluid pressure brake apparatus, in combination, a brake pipe, means operable by fluid under pressure to effect application of brakes, a control reservoir, a supply reservoir, a brake controlling valve device operable in response to a chosen reduction in pressure in said brake pipe below that in said control reservoir to supply fluid under pressure from said supply reservoir to the fluid pressure operable means, quick service means controlled by pressure of fluid in said brake pipe and an opposing pressure operative, upon less than said chosen reduction in brake pipe pressure, to establish, independent of said brake controlling valve device, a quick service communication with said brake pipe through which quick service venting of fluid under pressure from said brake pipe is effected, and a valve device operative in response to a chosen pressure of fluid supplied by said brake controlling valve device to said fluid pressure operable means to close said communication and thereby terminate quick service venting of fluid under pressure from said brake pipe.

24. In a fluid pressure brake apparatus, in combination, a brake pipe, means operable by fluid under pressure to effect application of brakes, a control reservoir, a supply reservoir, a brake controlling valve device operable in response to a chosen reduction in pressure in said brake pipe below that in said control reservoir to supply fluid under pressure from said supply reservoir to the fluid pressure operable means, quick service means controlled by pressure of fluid in said brake pipe and an opposing pressure operative, upon less than said chosen reduction in brake pipe pressure, to establish, independent of said brake controlling valve device, a quick service communication with said brake pipe through which quick service venting of fluid under pressure from said brake pipe is effected, and in inshot valve device controlling said communication and also one of two other communications through which fluid under pressure flows from said brake controlling valve device to said fluid pressure operable means and operable in response to a chosen pressure of fluid supplied by said brake controlling valve device to said fluid pressure operable means to close both of the communications controlled thereby.

25. In a fluid pressure brake apparatus, in combination, a brake pipe, means operable by fluid under pressure to effect application of brakes, a control reservoir, a supply reservoir, a brake controlling valve device operable in response to a chosen reduction in pressure in said brake pipe below that in said control reservoir to supply fluid under pressure from said supply reservoir to the fluid pressure operable means, quick service means controlled by pressure of fluid in said brake pipe and an opposing pressure operative, upon less than said chosen reduction in brake pipe pressure, to establish, independent of said brake controlling valve device, a quick service communication with said brake pipe through which quick service venting of fluid under pressure from said brake pipe is effected, two communications through which fluid under pressure flows from said supply reservoir to said fluid pressure operable means upon said operation of said brake controlling valve device; a choke in one of said two communications, inshot valve means normally opening the other of said two communications and said quick service communication, and operative to close both of such communications in response to a chosen pressure of fluid in a chamber, and a choked communication opening said chamber to the other of said two communications at fluid pressure operable means side of said inshot valve means.

26. In a fluid pressure brake apparatus, in combination, a brake pipe, a control reservoir, a supply reservoir, means operable by fluid under pressure to effect application of brakes and upon release of fluid under pressure release of brakes, a control valve device operable by pressure of fluid in said control reservoir upon a reduction in pressure in a chamber to supply fluid under pressure from said supply reservoir to the fluid pressure operable means and by a chosen increase in pressure in said chamber relative to pressure of fluid in said control reservoir to release fluid under pressure from said fluid pressure operable means, said control device comprising a casing, two spaced-apart flexible diaphragms disposed in said casing in coaxial relation with each other and subject on their adjacent faces to atmospheric pressure and pressure in said chamber, respectively, the diaphragm subject on one side to atmospheric pressure being subject on its opposite side to pressure of fluid in said fluid pressure operable means and the other diaphragm being subject on its opposite side to pressure of fluid in said control reservoir, a stem slidably mounted in a bore in said casing and connecting said diaphragms to each other, a passageway in said casing connecting said brake pipe to said bore, said stem comprising means controlling communication between said passageway and said chamber and operative by preponderance in force developed by pressure in said chamber and fluid pressure operable means acting on the respective diaphragms over that created by pressure of fluid in said control reservoir acting on the respective diaphragm to either throttle or close said communication between said passageway and chamber in accordance with the differential between the two opposing forces, a communication including a choke connecting said chamber to said supply reservoir, a check valve in the last named communication seatable by pressure of fluid in the supply reservoir to prevent flow of fluid under pressure through the last named communication from said supply reservoir to said chamber and unseatable by a preponderance in pressure in said chamber over that in said chamber to provide for flow of fluid under pressure in the reverse direction from said chamber to said supply reservoir for charging said supply reservoir, and means for preventing unseating of said check valve by a differential between the pressures in said supply reservoir and chamber a chosen degree in excess of that between the pressures in said chamber and control reservoir at which said control valve device operates to release fluid under pressure from said fluid pressure operable means.

References Cited in the file of this patent
UNITED STATES PATENTS

| Number | Name | Date |
|---|---|---|
| 836,886 | Mann | Nov. 27, 1906 |
| 1,936,966 | Kasantzeff | Nov. 28, 1933 |
| 2,058,012 | Guillemin-Tarayre | Oct. 20, 1936 |
| 2,068,342 | McClure | Jan. 19, 1937 |
| 2,109,168 | Miller | Feb. 22, 1938 |
| 2,125,155 | Farmer | July 26, 1938 |
| 2,125,164 | Hewitt et al. | July 26, 1938 |
| 2,227,872 | Wilson | Feb. 10, 1942 |
| 2,276,927 | Christen | Mar. 17, 1942 |
| 2,364,927 | Sudduth | Dec. 12, 1944 |
| 2,528,143 | Hewitt | Oct. 31, 1950 |
| 2,707,134 | Cook | Apr. 26, 1955 |

FOREIGN PATENTS

| Number | Country | Date |
|---|---|---|
| 668,122 | Great Britain | Mar. 12, 1952 |